April 28, 1970     R. C. HULL ET AL     3,508,637
DUAL SPEED STEPPER CARRIAGE

Filed Aug. 21, 1967     26 Sheets-Sheet 1

INVENTOR.
ROGER C. HULL
EUGENE T. KOZOL

BY Francis V. Giolma
ATTORNEY

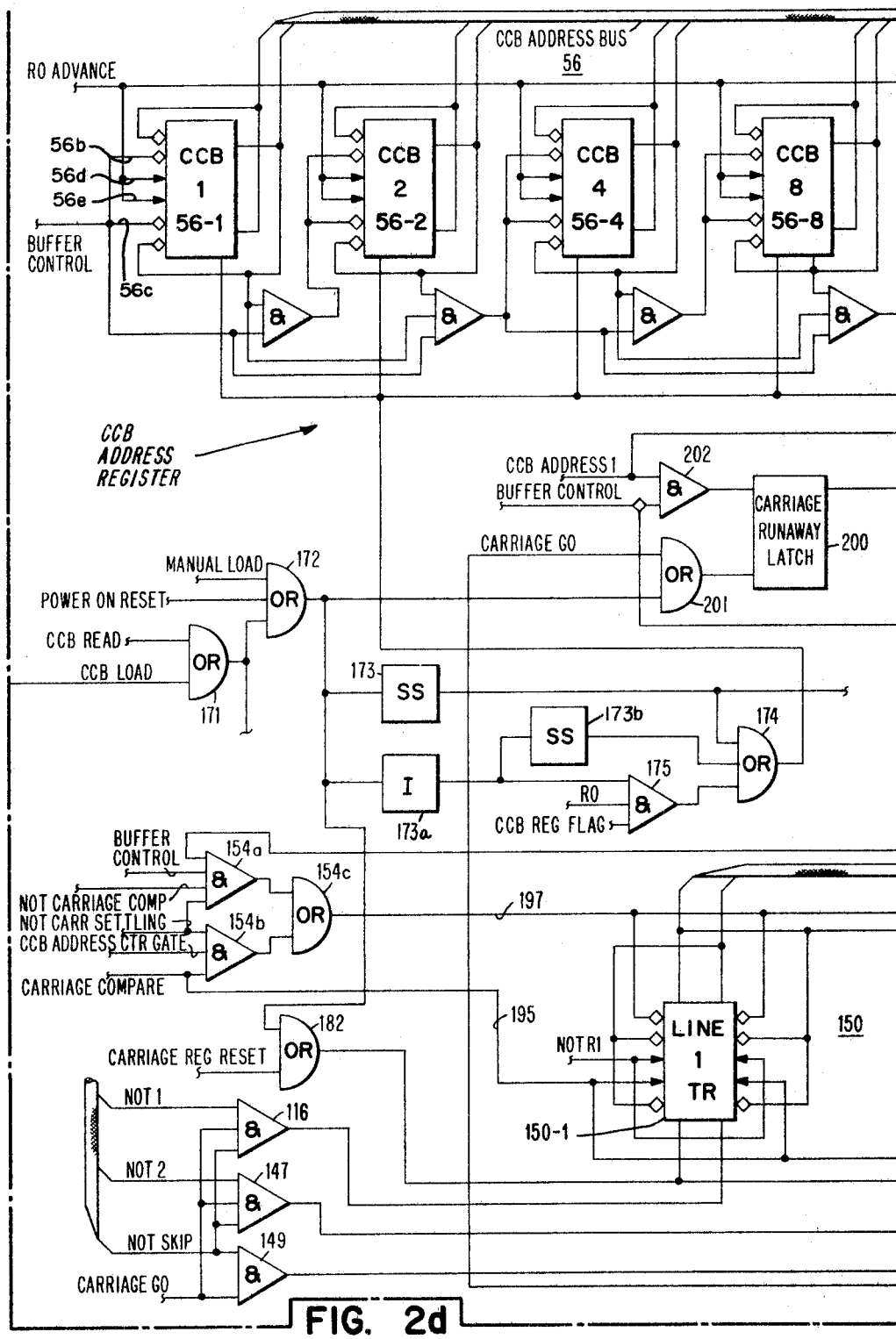

| FIG.2a | FIG.2b | FIG.2c | FIG.2d | FIG.2e | FIG.2f | FIG.2g | FIG.2h | FIG.2i | FIG.2j |
|---|---|---|---|---|---|---|---|---|---|
| FIG.2k | FIG.2l | FIG.2m | FIG.2n | FIG.2o | FIG.2p | FIG.2q | FIG.2r | FIG.2s | FIG.2t |

VALID CARRIAGE CONTROL BUFFER CODES
THE FOLLOWING CODES CONTAIN THE FLAG BIT FOR DEFINING
THE LAST LINE OF THE FORM

| CODE | BUS OUT BITS |
|---|---|
| | P 0 1 2 3 4 5 6 7 |
| SPACE | 0 0 0 0 1 0 0 0 0 |
| CHANNEL 1 | 1 0 0 0 1 0 0 0 1 |
| CHANNEL 2 | 1 0 0 0 1 0 0 1 0 |
| CHANNEL 3 | 0 0 0 0 1 0 0 1 1 |
| CHANNEL 4 | 1 0 0 0 1 0 1 0 0 |
| CHANNEL 5 | 0 0 0 0 1 0 1 0 1 |
| CHANNEL 6 | 0 0 0 0 1 0 1 1 0 |
| CHANNEL 7 | 1 0 0 0 1 0 1 1 1 |
| CHANNEL 8 | 1 0 0 0 1 1 0 0 0 |
| CHANNEL 9 | 0 0 0 0 1 1 0 0 1 |
| CHANNEL 10 | 0 0 0 0 1 1 0 1 0 |
| CHANNEL 11 | 1 0 0 0 1 1 0 1 1 |
| CHANNEL 12 | 0 0 0 0 1 1 1 0 0 |

NOTE: BIT 3 IS THE LAST LINE FLAG BIT

FIG. 4

THE FOLLOWING CODES ARE USED TO
DEFINE LINE POSITIONS OTHER THAN
THE LAST LINE OF THE FORM

| CODE | BUS OUT BITS |
|---|---|
| | P 0 1 2 3 4 5 6 7 |
| SPACE | 1 0 0 0 0 0 0 0 0 |
| CHANNEL 1 | 0 0 0 0 0 0 0 0 1 |
| CHANNEL 2 | 0 0 0 0 0 0 0 1 0 |
| CHANNEL 3 | 1 0 0 0 0 0 0 1 1 |
| CHANNEL 4 | 0 0 0 0 0 0 1 0 0 |
| CHANNEL 5 | 1 0 0 0 0 0 1 0 1 |
| CHANNEL 6 | 1 0 0 0 0 0 1 1 0 |
| CHANNEL 7 | 0 0 0 0 0 0 1 1 1 |
| CHANNEL 8 | 0 0 0 0 0 1 0 0 0 |
| CHANNEL 9 | 1 0 0 0 0 1 0 0 1 |
| CHANNEL 10 | 1 0 0 0 0 1 0 1 0 |
| CHANNEL 11 | 0 0 0 0 0 1 0 1 1 |
| CHANNEL 12 | 1 0 0 0 0 1 1 0 0 |

FIG. 5

| COMMAND | BUS OUT BITS |
|---|---|
|  | P 0 1 2 3 4 5 6 7 |
| TEST I/O | 1 0 0 0 0 0 0 0 0 |
| SENSE | 0 0 0 0 0 0 1 0 0 |
| WRITE WITHOUT SPACING | 0 0 0 0 0 0 0 0 1 |
| WRITE AND SPACE 1 | 1 0 0 0 0 1 0 0 1 |
| WRITE AND SPACE 2 | 1 0 0 0 1 0 0 0 1 |
| WRITE AND SPACE 3 | 0 0 0 0 1 1 0 0 1 |
| WRITE AND SKIP TO CHAN 1 | 0 1 0 0 0 1 0 0 1 |
| WRITE AND SKIP TO CHAN 2 | 0 1 0 0 1 0 0 0 1 |
| WRITE AND SKIP TO CHAN 3 | 1 1 0 0 1 1 0 0 1 |
| WRITE AND SKIP TO CHAN 4 | 0 1 0 1 0 0 0 0 1 |
| WRITE AND SKIP TO CHAN 5 | 1 1 0 1 0 1 0 0 1 |
| WRITE AND SKIP TO CHAN 6 | 1 1 0 1 1 0 0 0 1 |
| WRITE AND SKIP TO CHAN 7 | 0 1 0 1 1 1 0 0 1 |
| WRITE AND SKIP TO CHAN 8 | 0 1 1 0 0 0 0 0 1 |
| WRITE AND SKIP TO CHAN 9 | 1 1 1 0 0 1 0 0 1 |
| WRITE AND SKIP TO CHAN 10 | 1 1 1 0 1 0 0 0 1 |
| WRITE AND SKIP TO CHAN 11 | 0 1 1 0 1 1 0 0 1 |
| WRITE AND SKIP TO CHAN 12 | 1 1 1 1 0 0 0 0 1 |

FIG. 6a

| COMMAND | BUS OUT BITS |
|---|---|
|  | P 0 1 2 3 4 5 6 7 |
| NO OP | 1 0 0 0 0 0 0 1 1 |
| SPACE 1 IMMEDIATE | 0 0 0 0 0 1 0 1 1 |
| SPACE 2 IMMEDIATE | 0 0 0 0 1 0 0 1 1 |
| SPACE 3 IMMEDIATE | 1 0 0 0 1 1 0 1 1 |
| SKIP IMMEDIATE TO CHAN 1 | 1 1 0 0 0 1 0 1 1 |
| SKIP IMMEDIATE TO CHAN 2 | 1 1 0 0 1 0 0 1 1 |
| SKIP IMMEDIATE TO CHAN 3 | 0 1 0 0 1 1 0 1 1 |
| SKIP IMMEDIATE TO CHAN 4 | 1 1 0 1 0 0 0 1 1 |
| SKIP IMMEDIATE TO CHAN 5 | 0 1 0 1 0 1 0 1 1 |
| SKIP IMMEDIATE TO CHAN 6 | 0 1 0 1 1 0 0 1 1 |
| SKIP IMMEDIATE TO CHAN 7 | 1 1 0 1 1 1 0 1 1 |
| SKIP IMMEDIATE TO CHAN 8 | 1 1 1 0 0 0 0 1 1 |
| SKIP IMMEDIATE TO CHAN 9 | 0 1 1 0 0 1 0 1 1 |
| SKIP IMMEDIATE TO CHAN 10 | 0 1 1 0 1 0 0 1 1 |
| SKIP IMMEDIATE TO CHAN 11 | 1 1 1 0 1 1 0 1 1 |
| SKIP IMMEDIATE TO CHAN 12 | 0 1 1 1 0 0 0 1 1 |

FIG. 6b

United States Patent Office 3,508,637
Patented Apr. 28, 1970

3,508,637
DUAL SPEED STEPPER CARRIAGE
Roger C. Hull, Endicott, and Eugene T. Kozol, Binghamton, N.Y., assignors to International Business Machines Corporation, Armonk, N.Y., a corporation of New York
Filed Aug. 21, 1967, Ser. No. 661,930
Int. Cl. B41j 15/00
U.S. Cl. 197—133                    5 Claims

ABSTRACT OF THE DISCLOSURE

A stepping motor is started by an initial advance pulse from a carriage control and thereafter advanced by feedback pulses from an emitter driven by the motor. Low and high speed emitter pickup heads are gated by low and high speed latches under the control of a line counter and a carriage counter in the controls to start in low speed, shift to high speed if more than a predetermined number of lines are to be skipped, and then revert to low speed operation before being stopped by a predetermined series of stop pulses.

CROSS-REFERENCE TO RELATED APPLICATIONS

This invention is related to the invention of copending application Ser. No. 661,929 of Frederick W. Schaaf, filed Aug. 21, 1967 and is shown in part therein.

FIELD OF INVENTION

This invention relates generally to motor control systems and it has reference in particular to a stepping motor drive for driving a carriage in a high speed printer.

DESCRIPTION OF PRIOR ART

Heretofore carriages for high speed printers have in general been driven by hydraulic drive means with solenoid valves operated in response to skip signals to skip at high speed if more than a predetermined skip was ordered or detected by brushes positioned to detect holes punched in a control paper tape, as shown in the A. W. Mills et al. Patent No. 2,531,885 which issued on Nov. 28, 1950 and is assigned to the assignee of the present invention.

SUMMARY OF THE INVENTION

Generally stated it is an object of this invention to provide a new and novel carriage drive for a high speed printer.

More specifically it is an object of this invention to provide a multi-speed closed loop stepping motor drive for a carriage in a printer.

Another object of this invention is to provide for changing the speed of a stepping motor by changing the time and displacement relation of feedback pulses used to drive the motor.

Yet another object of the invention is to provide in a stepping motor drive using differently positioned pickup heads for furnishing feedback pulses having different time displacement relations to obtain different operating speeds.

It is also an object of this invention to provide for furnishing feedback pulses for operating a stepping motor at one speed and inverting pulses from the same source, and using them for operating the motor at different speeds.

Still another object of the invention is to provide for using a line counter to control the operation of a stepping motor drive for a printer carriage.

It is also an important object of this invention to provide for jointly controlling the operation of a stepping motor in a carriage drive for a printer by means of a line counter which counts line spaces, and a carriage counter which counts pulses applied to the motor.

Yet another important object of the invention is to provide for changing speed by shifting control of a stepper motor from one source of feedback pulses to another without getting out of step.

It is also an object of the invention to provide for using in a carriage drive a line counter which counts advance of the carriage by lines, and a carriage counter which counts the individual advance steps of the carriage motor, for each line advance for determining the individual steps as well as the particular line at which changes of speed will be made.

A carriage stepping motor is started by means of an initial pulse produced by turning on a low speed latch in response to a carriage go signal from carriage control circuitry, and thereafter advances in response to feedback pulses gated from a motor emitter by the low speed latch output. If a skip of more than fifteen lines is called for, high speed and ultra high speed latches are turned on which gate pulses from a high speed read head and then an ultra high speed circuit to drive the motor. A line counter advanced by a clock under the control of emitter pulses, provides a signal a predetermined number of lines before the end of the skip to reset the ultra high and then the high speed latches and return the motor to the low speed mode, whereupon, a certain number of pulses before the motor is to stop as determined by the line counter and a carriage counter which counts pulses applied to the motor, a stop pulse is produced which initiates stopping, and provides for a string of three timed open loop stop pulses to bring the motor to a stop.

The foregoing and other objects, features, and advantages of the invention will be apparent from the following more particular description of a preferred embodiment of the invention as illustrated in the accompanying drawing.

DESCRIPTION OF THE DRAWING

In the drawing:
FIG. 4 is a chart showing typical carriage control codes;
FIG. 5 is a chart showing typical codes to define line positions other than the last line of a form;
FIGS. 6a through 6b are charts showing valid commands for control of a printer carriage utilizing the invention.

DESCRIPTION OF PREFERRED EMBODIMENT

Figure 1:
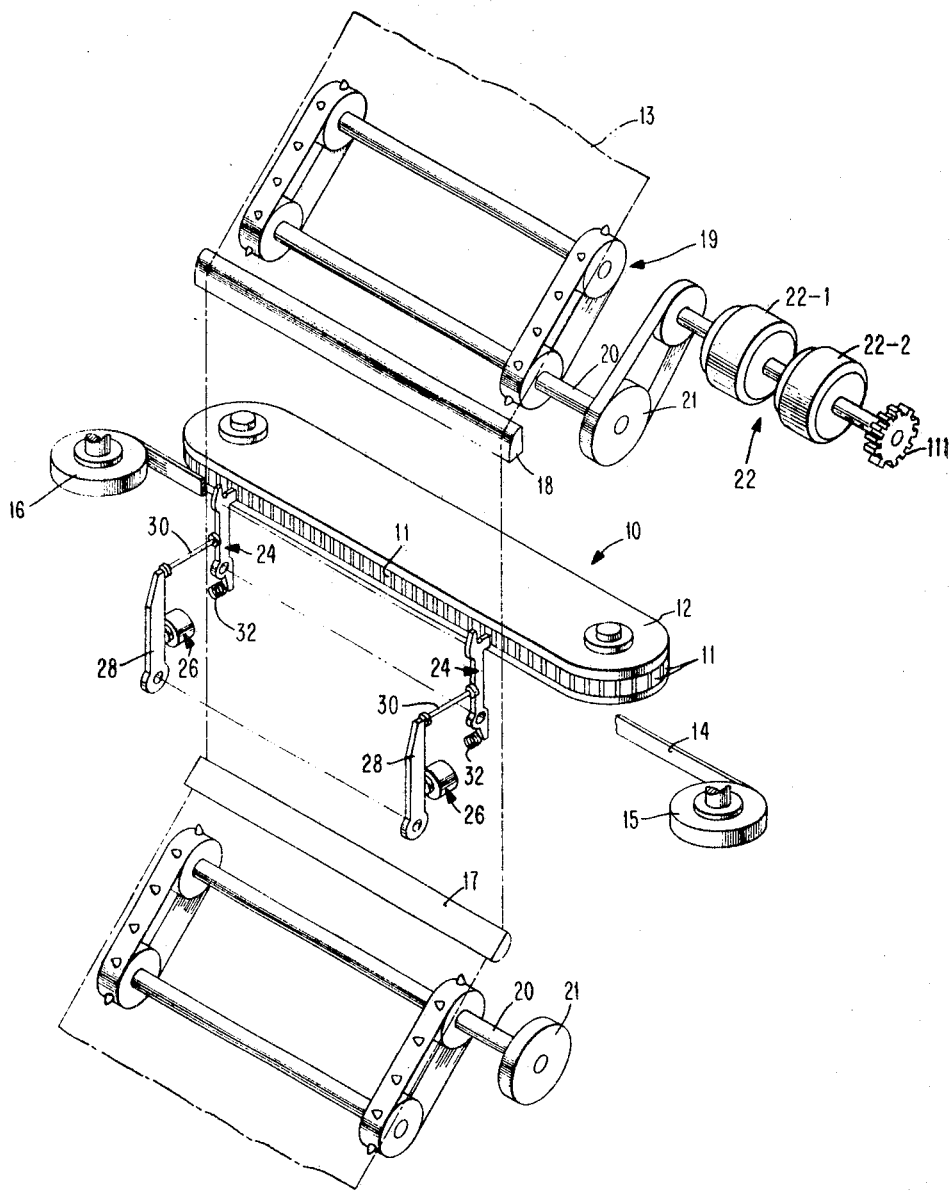
FIG. 1 is a schematic showing in part of one type of printer apparatus with which the invention may be used.

FIG. 1 shows a printer apparatus of one type with which the present invention may be used, and comprises a type carrier 10 having a plurality of individual type elements 11 movable in a continuous path on a stationary frame 12. A portion of the path of motion of the type elements 11 includes a straight portion along which printing can occur and which hereinafter is referred to as the print line. Each type element 11 has one or more different engraved characters on the surface thereof adjacent the print line. Plural sequences of type characters are obtained by assembling the type elements 11 in predetermined arrangements on the frame 12. The type elements 11 are driven preferably in the form of a train along the frame 12 so that they travel at a constant velocity and are maintained in abutting relation along the straight portion of the path of travel.

The printer apparatus of FIG. 1 is a back printer which is described in U.S. Patent 3,241,480 which issued on Mar. 22, 1966 to James M. Cunningham, and in accordance with well-known operational principles thereof a paper document 13 is positioned behind an ink ribbon 14 or the like which in turn is positioned immediately adjacent the type elements 11 over the print line portion thereof. The ribbon 14 may be fed in a suitable manner between spools 15 and 16 along the line of travel of the type elements 11. The paper document 13, however, is fed transversely to the direction of motion of the type. Guide bars 17 and 18 and carriage forms feed tractors 19 co-act to support and move the paper document 13 in the proper line of travel. Generally, printing occurs while the paper 13 is stationary relative to the print line. On completion of a print cycle, the paper 13 is advanced one or more spaces by the carriage tractors 19 to a position where a new line of data may be printed. The means for feeding the paper 13 in synchronism with operation of the print mechanism are well known in the art and may include a carriage drive motor 22 comprising for example dual motor units 22-1 and 22-2 or the like connected to shafts 20 by means of pulleys 21 or the like of the carriage tractors 19. The motors may be of the well known stepping motor type, having a multi-toothed rotor and a stator with bifilar phase related windings such as shown and described in U.S. Patent No. 3,293,459 which issued Dec. 20, 1966 to K. G. Kreuter, et al.

In the printer apparatus of FIG. 1, the arrangement shown is for a back printer. This arrangement is merely used by way of example and not by way of limitation, since the invention may be as readily used with a front printer. As shown, printing occurs when the paper 13 and ribbon 14 are impacted against the type characters on the type elements 11. The impacting occurs at various print positions along the print line to eventually form a complete line of data. For this purpose, a plurality of print hammers 24 are mounted behind the print medium 13. Print hammers 24 are arranged to be uniformly spaced so that one hammer 24 occupies each print position along the print line, and the hammers 24 are aligned in a single row parallel to the print line. Each print hammer 24 is a part of an individual hammer unit which comprises an electromagnet 26 with an armature 28 and a push rod connector element 30 with bias springs 32 which maintain the hammers 24 out of contact with the paper 13 when the electromagnet 26 is de-energized. Each hammer 24 is individually operable and the operation of the various hammers 24 occurs selectively at random positions along the print line in accordance with instructions from control means which comprises a type tracking device and co-acting storage device which indicates the particular data to be printed. Further details of a suitable control system may be more fully understood by reference to U.S. Patent No. 2,993,437 of F. M. Demer and E. J. Grenchus for a High Speed Printer, which issued July 25, 1961.

Heretofore, control of the tractor drive means 22 for advancing the paper 13 to the different line positions at which printing is desired had been controlled by means such as described in U.S. Patent No. 2,531,885 to A. W. Mills et al., which issued on Nov. 28, 1950, and is entitled, "Paper Feeding Device."

As therein described, control of the document feed was obtained by using a paper tape having a plurality of channels in which holes were punched at the particular line positions to which a skip operation was to be effected. A plurality of brushes aligned with these channels sensed the holes punched therein, and under the control of channel selecting commands from a processing unit, effected stopping of the document at the desired line positions.

As described in the copending application of Frederick W. Schaaf, Serial No. 661,929 filed Aug. 21, 1967 entitled, "Tapeless Carriage Control," that invention provides for replacing the punched paper tape control system and its sensing brushes with a carriage control buffer 40 wherein are stored binary coded representations of the channels containing the different skip commands, these representations being stored at the respective line positions to which skip operation is to be effected.

Figure 2A:
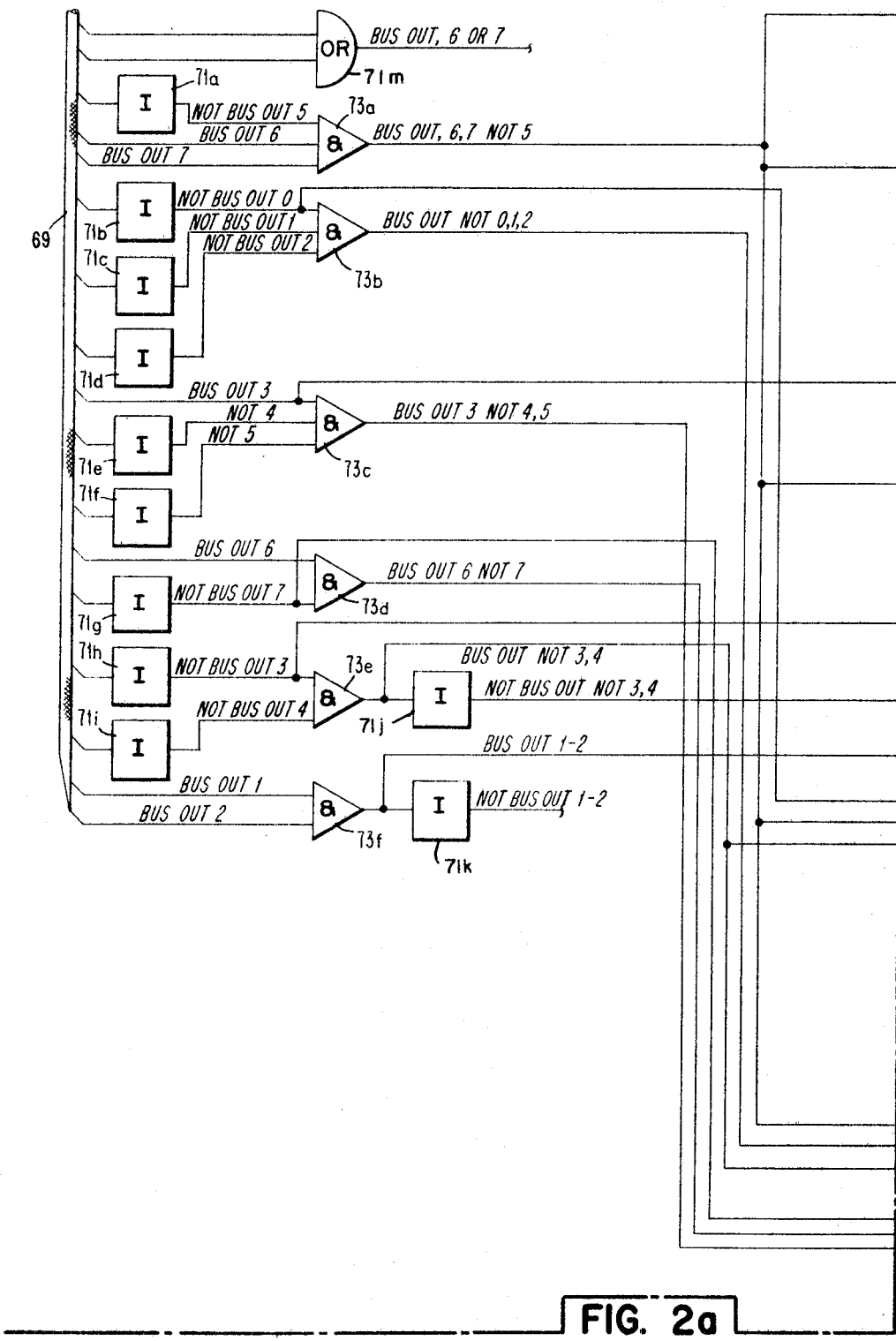
FIGS. 2a through 2t taken together provide a schematic diagram of a tapeless carriage control system which may be used with the carriage of FIG. 1 and has a stepping motor drive which embodies the invention in one of its forms.
Figure 2B:
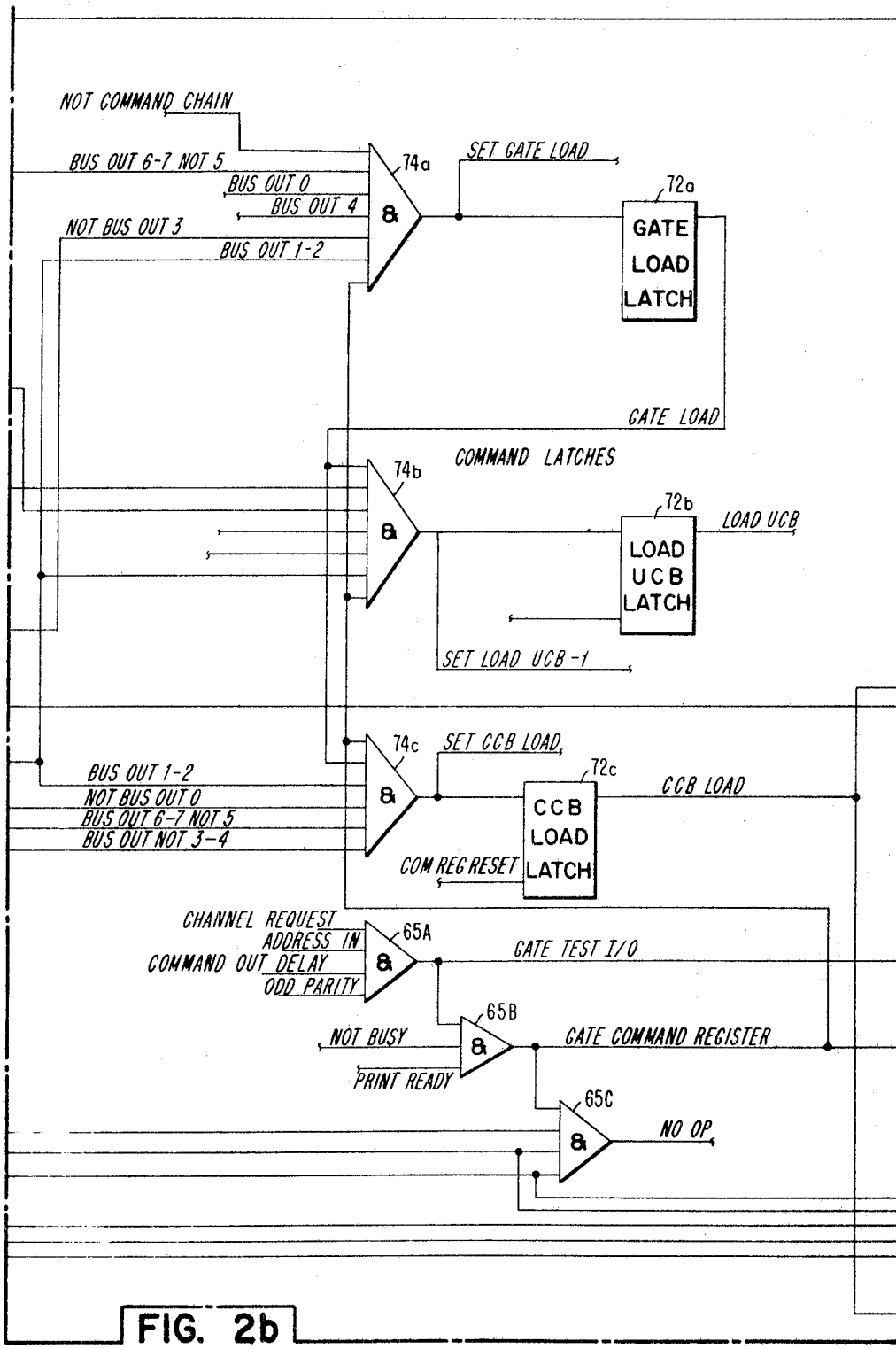
Figure 2C:
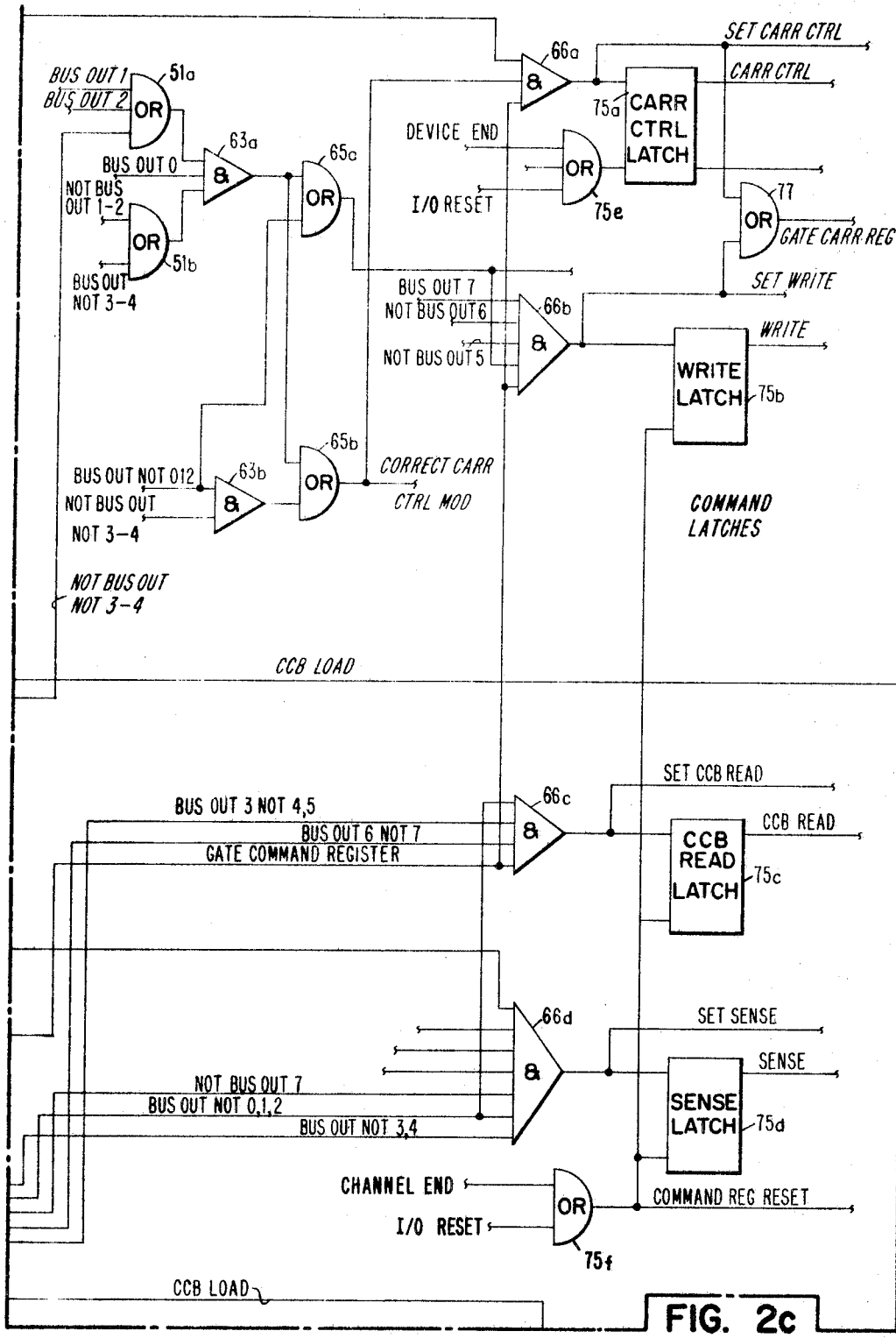

The Carriage Control Buffer 40 in the Schaaf application is a 16×16 core array containing 256 bytes, with core planes for an end of document Flag bit, 1, 2, 4, and 8 bits and a parity bit. As shown in FIGS. 2g and 2h the buffer 40 is provided with a plurality of X drivers 42 and corresponding X switches 44 for providing drive current in the X direction. Y drives 46 and Y switches 48 provide the corresponding Y drive. Inhibit drivers 50 and AND gates 51 are provided for selectively controlling the writing of information into the buffer 40 in response to data on the Carriage Control Buffer data bus 52. Sense amplifiers 54 and AND 55 provide for readout of the buffer 40, Flag, 1, 2, 4, 8 and P bit lines of the several core planes.

Figure 2E:
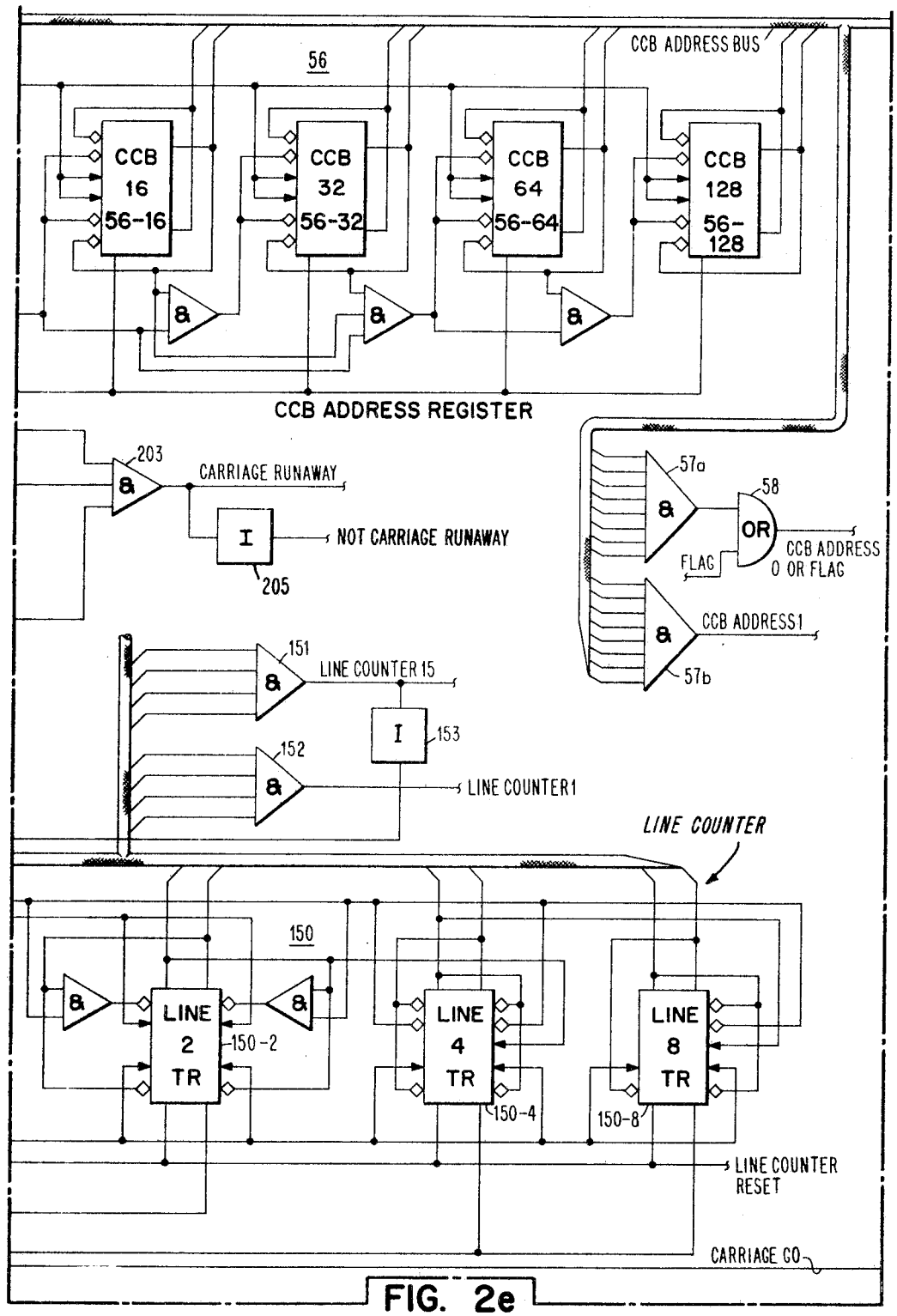
Figure 2F:
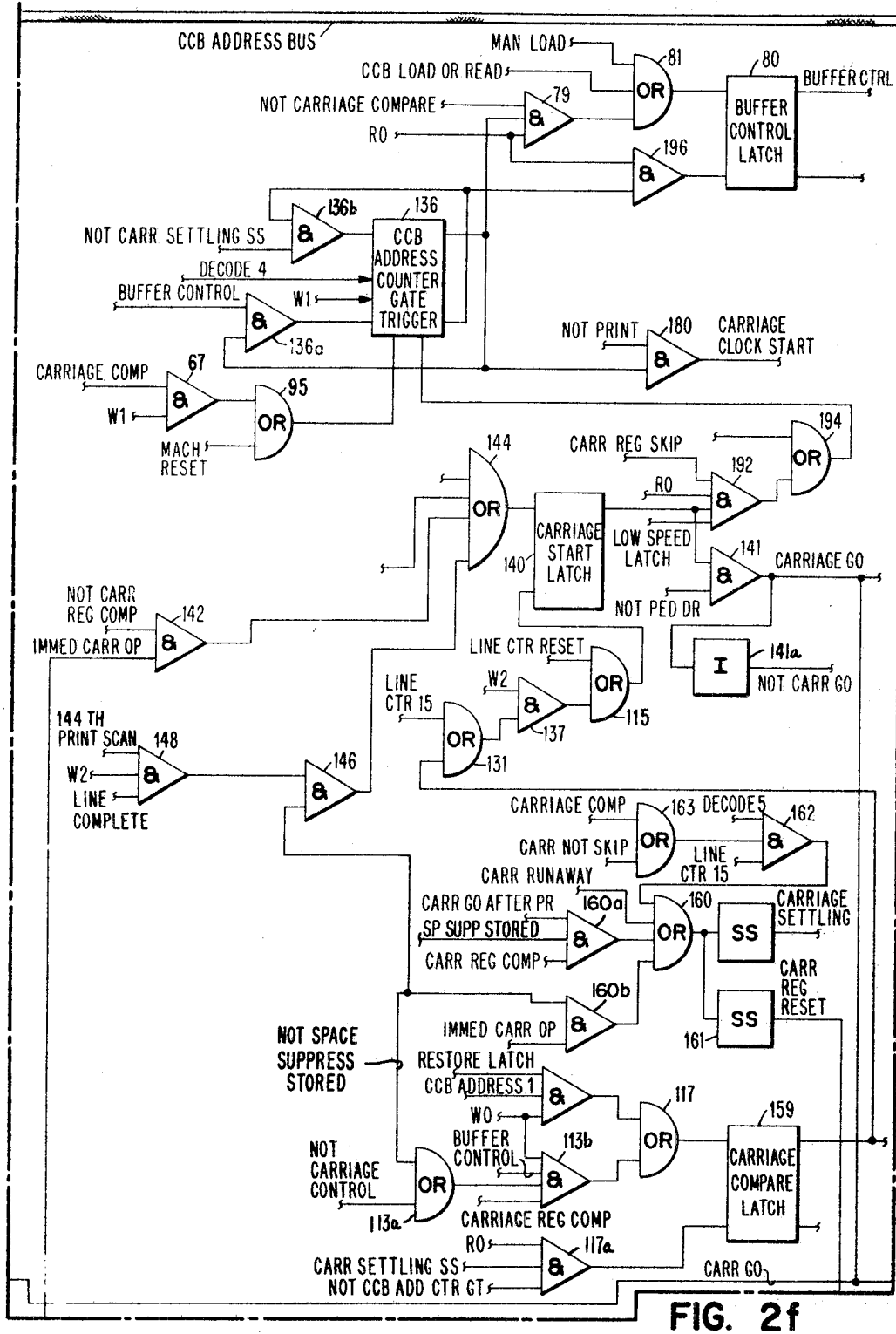
Figure 2G:
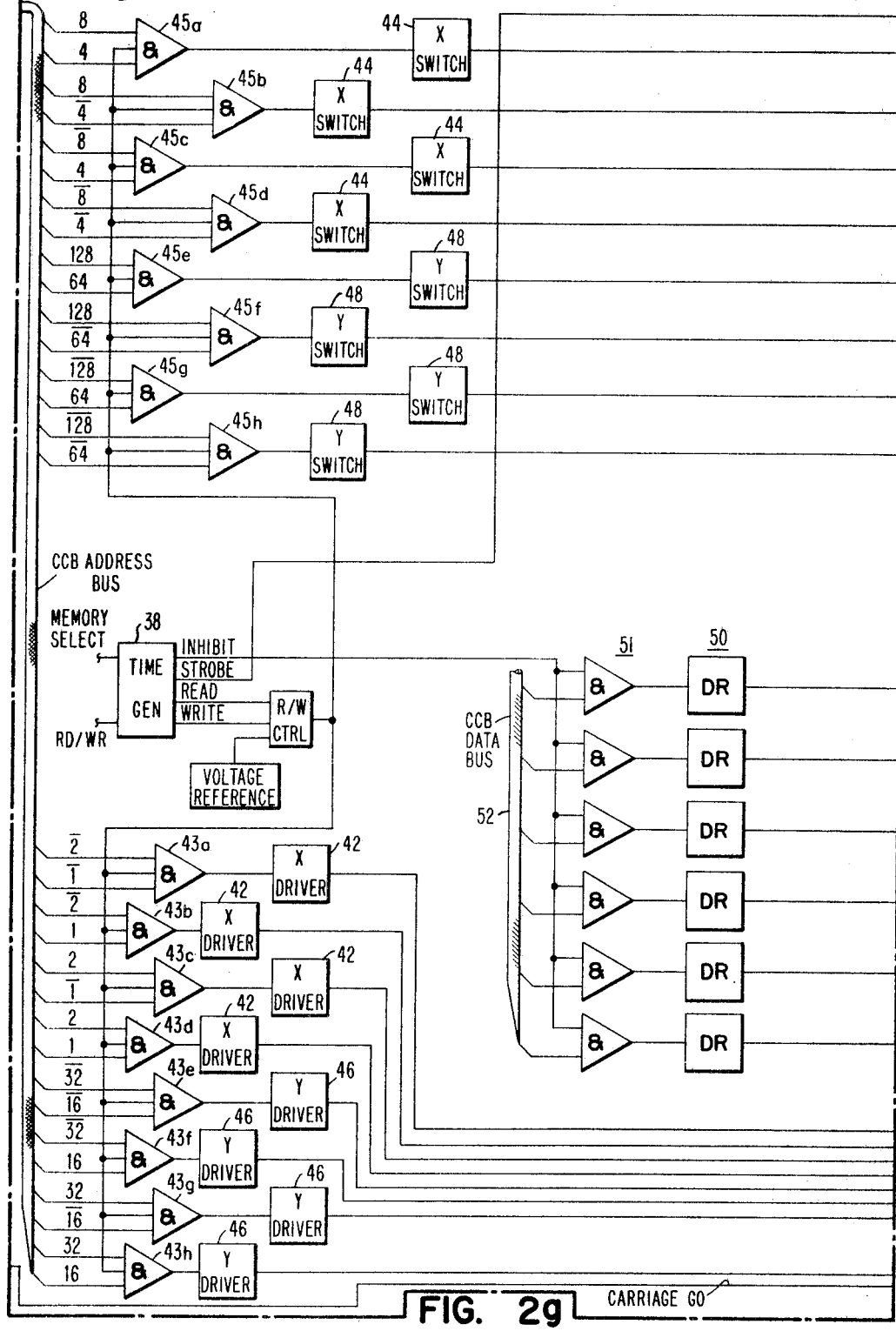
Figure 2H:
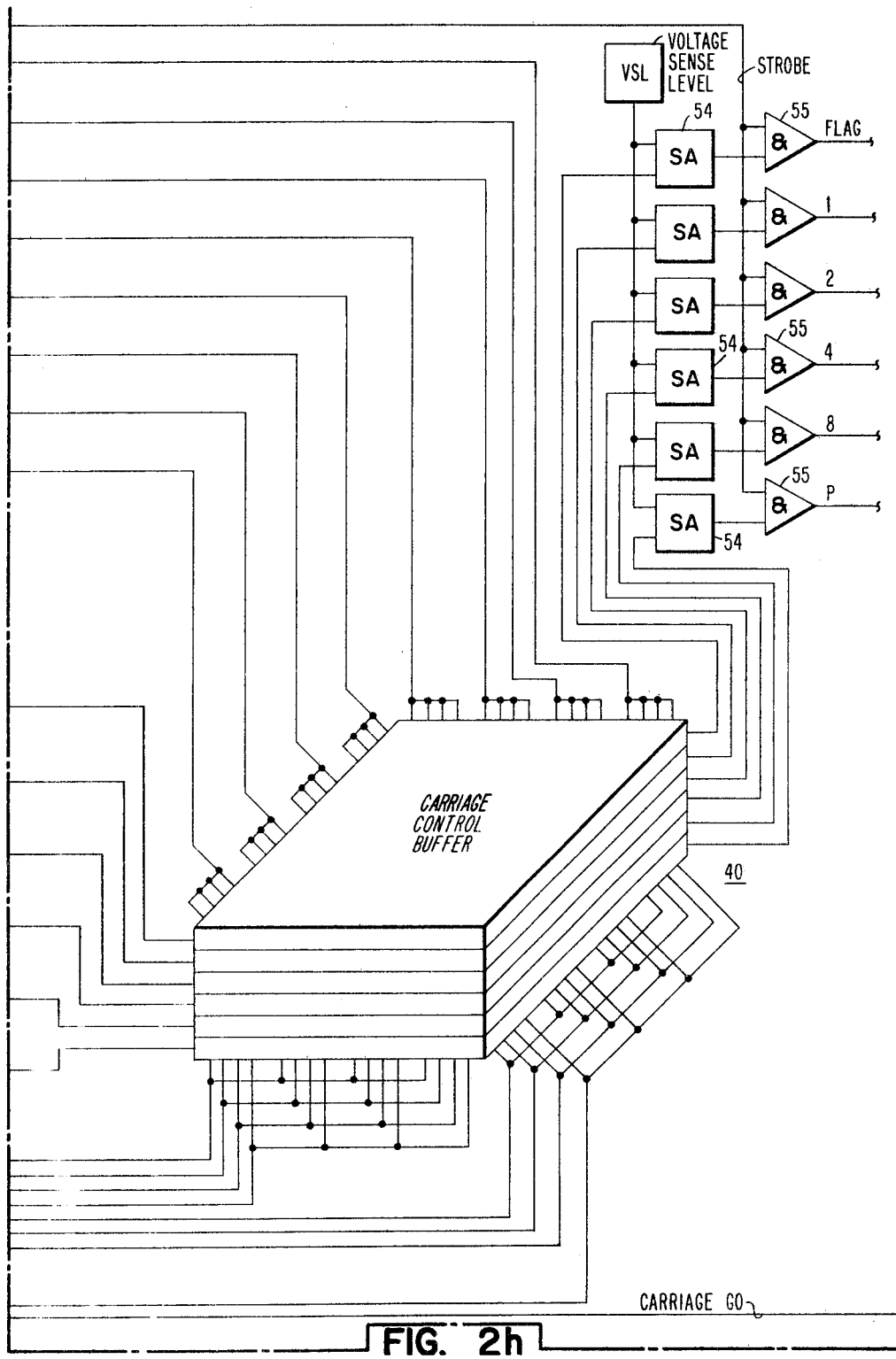

Addressing of the buffer 40 is effected by means of a CCB Address Register 56 shown in FIGS. 2d and 2e, and which comprises a plurality of triggers 56–1, 56–2, 56–4, through 56–128 arranged in a binary addressing fashion for addressing of the buffer 40. Triggers 56–1 and 56–2 are decoded by ANDs 43a–43d to form unique output lines for controlling the X drivers 42, while triggers 56–4 and 56–8 are similarly decoded by ANDs 45a–45d to control the X switches 44. Likewise, triggers 56–16 and 56–32 address the Y drivers 46 through ANDs 43e–43h while triggers 56–64 and 56–128 address the Y switches 48 through ANDs 45e–45h. The Address Register 56 is advanced by pulses from a clock 60 shown in FIGS. 2i and 2j, and which comprises a plurality of triggers 60–1 through 60–4 and decode ANDs 61a–61k with associated inverters 63a–d, single shots 63e–f and drivers 63g–i. Drive of the clock triggers 60–1 through 60–4 is obtained from a Clock Run trigger 62 through AND 64 in conjunction with pulses from oscillator 36. The trigger 62 is set through AND 68 and OR 70 by an Adapter Start signal from OR 84 (FIG. 2n) during loading of the buffer 40 and by a Carriage Clock Start signal from AND 180 (FIG. 2f) during readout of the buffer 40.

Figure 2I:
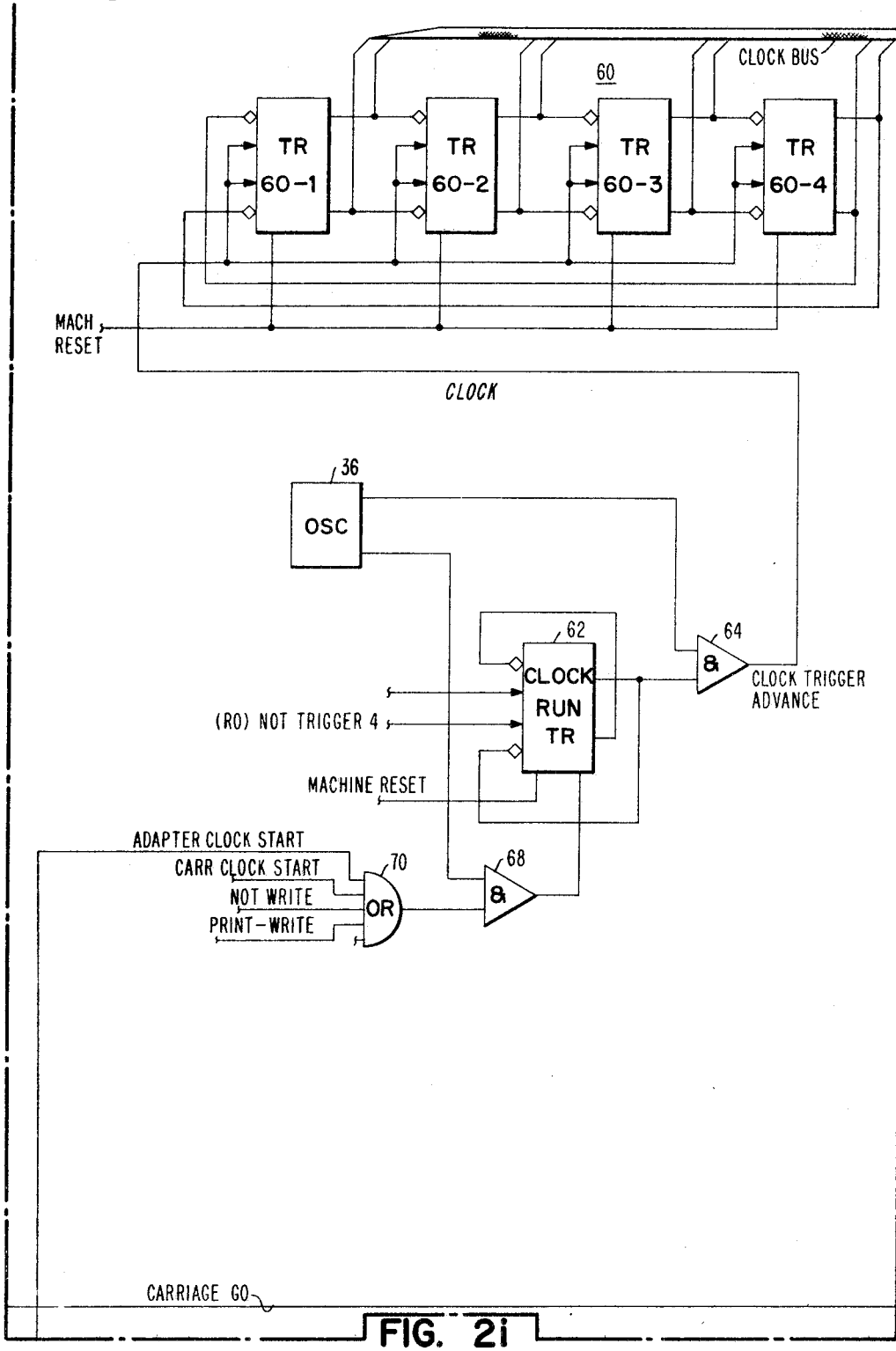
Figure 2J:
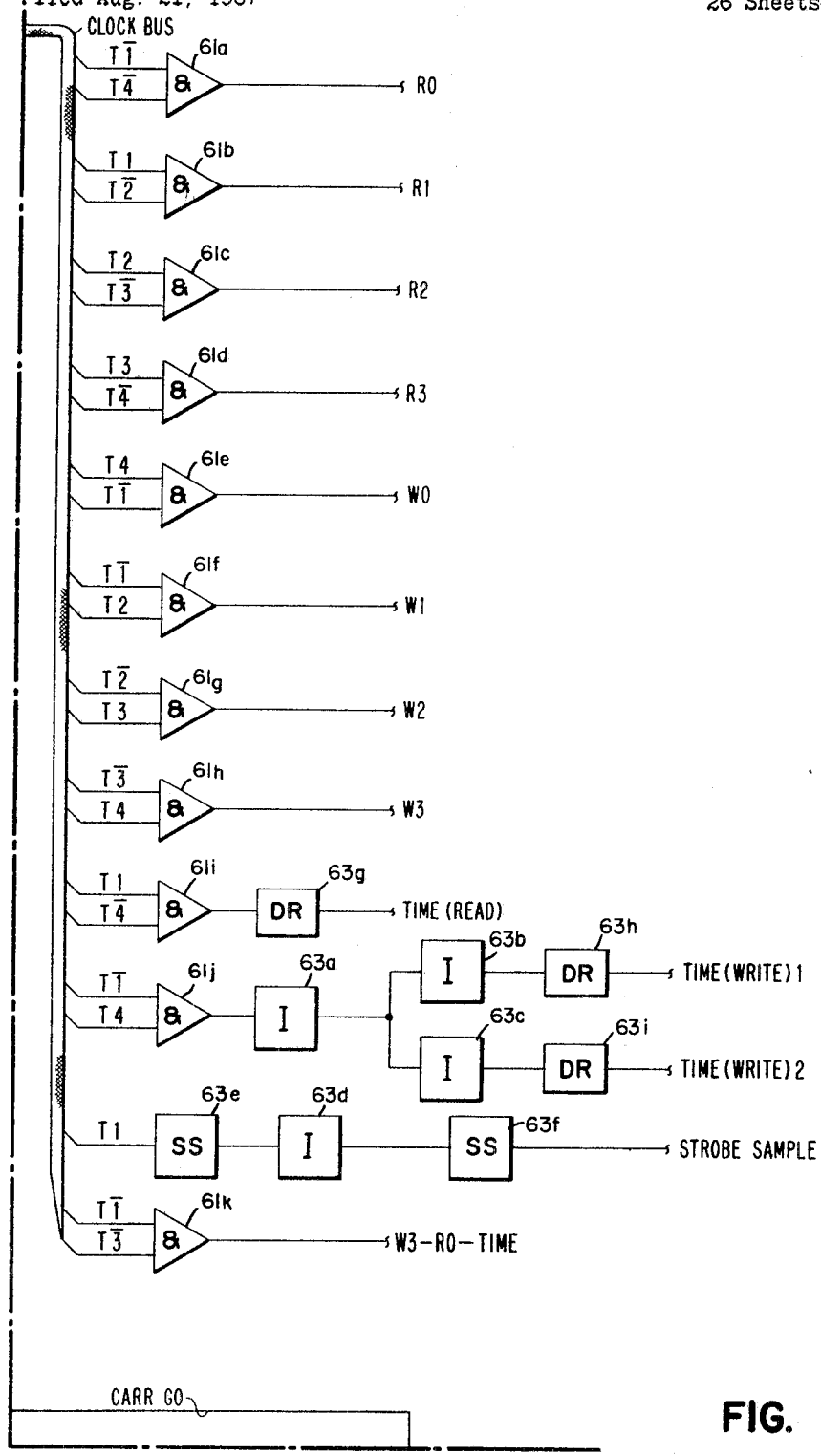

In order to avoid inadvertent modification of the Carriage Control Buffer contents, loading of the buffer 40 is effected in response to CCB Load command which follows a specific channel tag line sequence which is sensed and stored in a Gate Load latch 72a shown in FIG. 2b and which must be set before the CCB Load latch 72c can be set. An UCB Load latch 72b also shown, controls loading of a universal character buffer (not shown). These latches 72a–c respond to commands on the Bus Out lines 69 through decode ANDs 74a–74c, respectively. AND 59 and OR 47 (FIG. 2p) provide an Invalid CCB Address 1 signal at AND 59. Required NOT signals are obtained from the Bus Out lines 69 through Inverters 71a–k and decode ANDs 73a–f. OR 71m provides a BUS OUT 6 or 7 signal. Control of the CCB Address Register 56 during loading is effected by a Buffer Control latch 80, shown in FIG. 2f which is set by the CCB Load signal through OR 81 or by the output of AND 79. Data from the channel is loaded under the control of the I/O tag lines Service-In and Service-Out which gate signals from OR 38c, and one of ANDs 39a–c through AND 82 and OR 84 (FIG. 2n) which provides an adapter clock start signal for setting the clock trigger 62 (FIG. 2i). OR 39d provides an input to OR 84, while OR 39a also provides input to ORs 38a–c. Data is gated to a CCB register 83 (FIG. 2k) comprising a plurality of latches 83a–f for comparison through ORs 76a–h and ANDs 77a–c with command signals in a Command Register 78 (FIG. 2l), comprising latches 78a–e which are controlled from the Bus Out 69 through ORs 85a–f and decode ANDs 86a–k with the following byte relations.

| Bus Bit | CCB Register Bit |
|---|---|
| 4 | 8 |
| 5 | 4 |
| 6 | 2 |
| 7 | 1 |
| 3 | F |

The data is gated to the register 83 (FIG. 2k) by means of a plurality of ANDs 87a through 87l and ORs 88a–f to the latches 83a–f and to the CCB data bus 52 for controlling the inhibit drivers 50 (FIG. 2g) for storing data bits in the several planes of the different positions in the buffer 40 of FIG. 2h. ANDs 87m and 87n provide gating signals to different ones of the ANDs 87a–1 for manual and normal operations, respectively. Exclusive ORs 89a–e in conjunction with AND 89f provide a parity bit for latch 83a. Reset of latches 83a–f is provided through AND 90.

Readout of the CCB Buffer 40 in connection with carriage operations may occur with or without printing. Operations of the carriage tractors 19 is effected in accordance with the present invention by selectively energizing phase winding 22a, 22b, 22c and 22d, and 22A, 22B, 22C and 22D (FIG. 2t) of the carriage motors 22-1 and 22-2 of FIG. 1 which may comprise stepper motors of a well-known type, directly from and through a plurality of ANDs 94A, 94$\overline{A}$, 94B and 94$\overline{B}$ in response to energization of carriage stepping triggers 96A and 96B as shown in FIG. 2s. The ANDs 94A, 94$\overline{A}$, 94B and 94$\overline{B}$ to inhibit drive to the motor 22-2 (FIG. 1) when the pedestal drive signal from OR 191 (FIG. 2t) is removed by a Low Speed latch (FIG. 2) 120 being turned off, carriage counter trigger 130c is off, and the delay from decode 8ss 193 (FIG. 2t) is complete. The Low Speed Latch 120 is set by a Carriage Go signal from AND 141 (FIG. 2f) and is reset through OR 120a. The triggers 96A and 96B (FIG. 2s) are sequentially stepped in response to a Stepper Motor Advance signal from AND 98 through OR 100, in response to an Initial Advance from a single shot 102, or pulses from emitter means 118 comprising a plurality of emitter pickup heads 103, 104, and 106 associated with a slotted magnetic emitter disc 111 having a plurality of uniformly spaced teeth 111a driven by motor 22-1, 22-2 through amplifiers 108a–c single shots 109a and 109b, and ANDs 110d–g (FIG. 2r). The 6LPI outputs from the emitter head 103, the Low Speed emitter head 104, and the High Speed emitter head 106 are gated by means of output signals from ANDs 112 and 114 from the Low Speed latch 120, a High Speed latch 122, and/or an Ultra High Speed latch 124 (FIG. 2t). Selective control of these High and Ultra High Speed latches 122 and 124 is effected through ANDs 121a–d, ORs 123k–q, and ANDs 123a–j by a Carriage Counter 130 (FIG. 2r) which counts individual motor advance pulses and comprises a plurality of triggers 130a–c advanced in a binary fashion by feedback pulses from the AND 98 (FIG. 2s). Through a decode circuit of ANDs 132a–c (FIG. 2r) the counter 130 provides decode 4, decode 5, and decode 7 output signals, respectively. The Ultra High Speed emitter signal is produced from the High Speed emitter head 106 by inverting the output of head 106 through inverter 105 to drive single shot 107. Stop pulses are provided through ANDs 110a–110c by stop circuits 133, 134, and 135, each of which comprises, as shown for circuit 133, a plurality of cascade arranged single shots 133a, b, c, and d with associated inverters 133e and f and OR 133g to provide a series of three stop pulses.

A Shift latch 126 (FIG. 2t) is connected to be set by the off outputs of the High Speed latch 122 and the Ultra High Speed latch 124 through OR 126a and single shorts 127a and 127b respectively, to momentarily inhibit gating of the outputs of the Low and High Speed latches 120 and 122 through ANDs 112 and 114 when decelerating. This prevents the next immediate Low Speed or High Speed emitter pulse from attempting to drive the motor 22 and thus insures the correct decelerating sequence. The Shift latch 126 is reset through ANDs 123j or i, OR 123g, inverter 125 single shot 128 and OR 126b by either the Low Speed or High Speed emitter single shot 109a or 109b, so that the following emitter pulse can be gated by AND 112 or 114.

Figure 8:
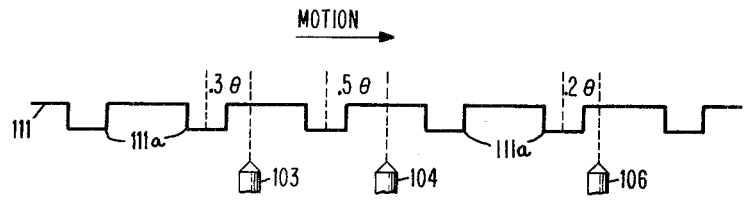
FIG. 8 is a schematic showing of the relative positions of the emitter pickup heads and the emitter teeth in one form of the invention.

As shown in FIG. 8, the Low Speed emitter head 104 is positioned approximately in the middle of the slot between two adjacent teeth 111a of the emitter disc 111 when the motor 22 is detented under power, the Low Speed emitter head 104 being indicated as being .5θ as the mechanical angle from the middle of the next tooth 111a. The High Speed head 106 is located closer to the next tooth 111a, being only .2θ from the middle of the next tooth 111a. While single spacing may be performed using the Low Speed head 104, a Single Space 6 line per inch emitter head 103 is provided in the present instance which is located between .3θ and .4θ from the center of the next tooth 111a, so as to provide a higher speed when single spacing, and thus increase the machine throughput. The head 103 is connected through amplifier 108a and AND 110d to the OR 100 and AND 98 in similar manner to the heads 104 and 106. AND 188a and inverter 105a provide inputs to ANDs 110d and 110e for single space operations.

Figure 9:
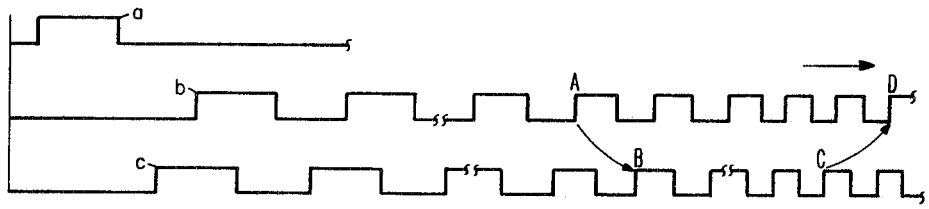
FIG. 9 is a timing chart showing typical transfer points in accelerating and decelerating.

As shown in FIG. 9 the motor starts with the Start pulse (a) and is normally accelerated by feedback pulses from first the Low Speed head 104 up to some point A shown on the curve (b). Control is then transferred to the High Speed head 106 at some point B shown on the High Speed feedback pulse curve (c). When it is desired to stop, control is transferred from the High Speed curve (c) at some point C to the Low Speed curve (b) at some point D, after which stopping is effected by the usual stop pulses.

AND 123a provides for turning on the High Speed and Ultra High Speed latches 122 and 124 through ORs 123m and n, and ANDs 121a and 121c when the line counter 150 reaches a count of 15 before a compare occurs between the skip command and the stored channel skip designation in the Carriage Control Buffer 40.

The High Speed latch 122 is set through AND 121a from OR 123m, OR 123k, and AND 123f when a skip of from 4–11 lines is called for at 6 lines per inch, and AND 123e provides a signal to the Ultra High Speed latch 124 through OR 123l, OR 123n and AND 121c.

AND 123c provides a signal to the High Speed latch 122 through OR 123m and AND 121a when a skip of 6–13 lines at 8 lines per inch is called for, and AND 123d provides a signal to Ultra High Speed latch 124 through OR 123l, OR 123n and AND 121c, when a greater than 14 line skip is called for. OR 123o provides inputs to ANDs 123c and 123d.

Deceleration from Ultra High Speed to High Speed at 8 lines per inch is provided by resetting the Ultra High speed latch 124 through AND 123g, OR 123p, AND 121d, and OR 124a, thirteen lines from the end of the skip. At 6 lines per inch the latch 124 is reset through AND 123h, OR 123p AND 121d, eleven lines before the end of the skip.

The High Speed latch 122 is reset at 8 lines per inch, five lines before the end of the skip, through AND 123g, OR 123p, AND 121b, and OR 122a, and at 6 lines per inch it is reset three lines before the end of the skip through AND 123h, OR 123p, AND 121b, and OR 122a.

Figure 10:
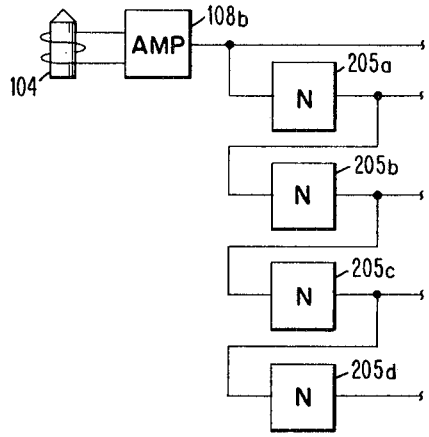
FIG. 10 is a schematic diagram of an emitter pulse circuit utilizing multiple inversions.
Figure 13:
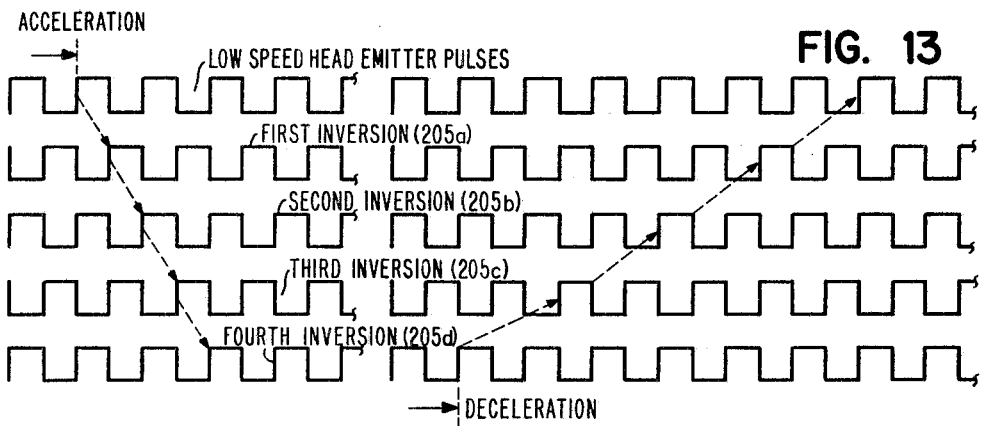
FIG. 13 is a timing chart showing the pulse relation when accelerating and decelerating with a multiple inversion circuit.

As shown in FIG. 10, a single low speed head 104 which is the same as the head 104 of FIG. 2r, is likewise used with the emitter 111, being also connected to an amplifier 108b in the same manner, to produce uniform amplification of positive and negative lobes of the emitter head 104 signals, so as to produce equal ON and OFF cycles as shown by the curves in FIG. 13 from inverters 205a–d, and several different motor speeds are obtainable by using repeated inversions of the signal by means such as inverters 205a, 205b, 205c and 205d each of which as shown by the curves in FIG. 13 inverts and in effect causes an advance in the time relation of the corresponding pulses upon each inversion to obtain the High Speed, Ultra High Speed and still greater speed signals, instead of using multiple emitter heads 103–104–106 as shown in FIG. 2r. The Low Speed Latch 120, High Speed Latch 122 and Ultra-High Speed Latch 124 are used with the cascaded inverter signals to gate these signals in the same manner as shown for the emitter head and inverter signals shown in FIG. 2r.

Figure 11:
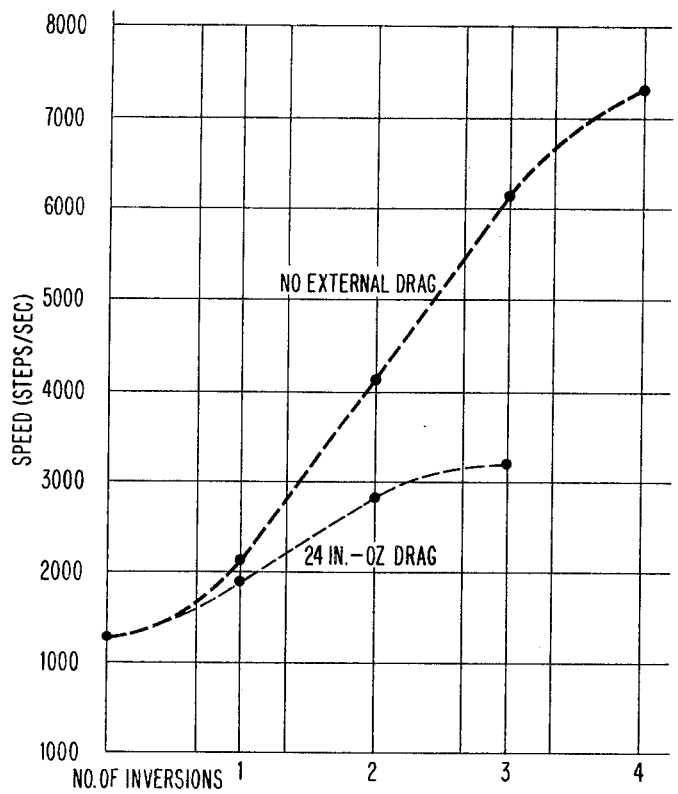
FIG. 11 is a chart showing the relations of speed with multiple inversion pulses.
Figure 12:
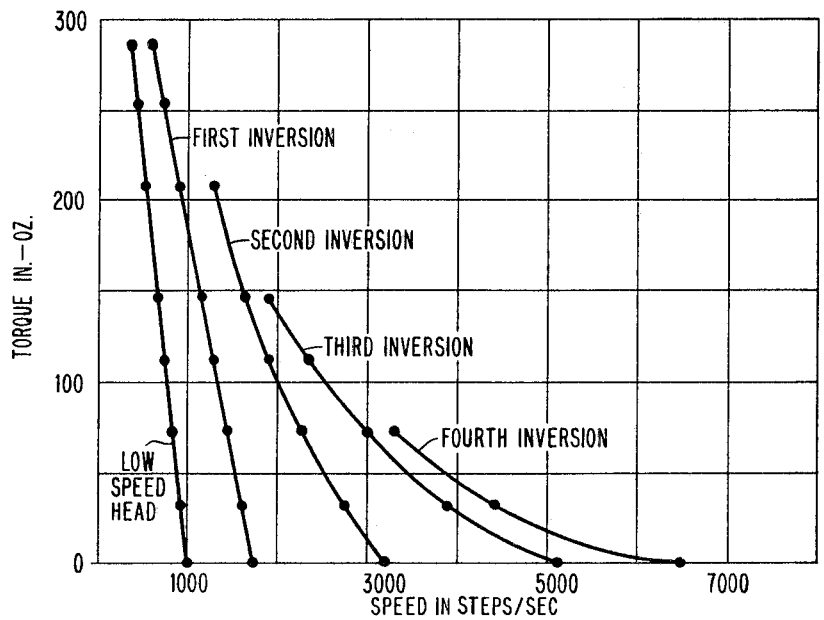
FIG. 12 is a chart showing the relation of speed and torque with multpile inversions.

The various speed and torque characteristics for the multiple inversion arrangement of FIG. 10 are shown in FIGS. 11 and 12, and in FIG. 13 are shown a plurality of emitter pulse curves with the dotted lines showing a typical transfer path from one speed to the next, the sequence being from one curve to the next, in order when accelerating, and in the reverse order when decelerating.

DESCRIPTION OF OPERATION

Operation of the clock 60 (FIG. 2i) during readout operations is effected under the control of a Carriage Control buffer Address counter Gate trigger 136 (FIG. 2f) which is set by the decode 4 signal from the decode circuit and 132a (FIG. 2r). Operation of the carriage drive circuit 96 (FIG. 2s) is effected by means of a Carriage Start latch 140 (FIG. 2f) which is turned on either by an Immediate Carriage Go signal from single shot 138 and AND 139 (FIG. 2q) or by a Carriage Go After Print signal from AND 148 (FIG. 2f) if a print operation is involved. These signals set the Carriage Start latch 140 through OR 144 and AND 142 or AND 146, respectively. Set of the Start Latch 140 provides a Carriage Go pulse through AND 141 for setting the Low Speed latch 120 (FIG. 2t) to start carriage operation. Stopping of the carriage is effected by resetting the Low Speed latch 120 through operation of a Line Counter 150 (FIGS. 2d–e) which comprises a plurality of triggers 150–1, 150–2, 150–4, and 150–8 arranged in a binary stepping fashion. AND's 151 and 152 provide Line Count 15 and Line Count 1 signals, respectively. Inverter 153 is used to inhibit further advance of the counter 150 when a count of 15 is reached without a compare through AND 154a.

The Low Speed latch 120 (FIG. 2t) is reset by a Carriage Register Reset signal generated at single shot 161 through OR 160 (FIG. 2f), in respone to the output of a Stop AND 162 which responds to the decode 5 and line count 15 signals with a carriage Not skip signal from OR 163.

Status latches 164ad (FIG. 2p) provide Busy, Channel End, and Device End Gate and Device End signals, indicative of the operating condition of the apparatus, through decode ANDs 165a–g, associated ORs 166a–g and ANDs 92 and 185. Sense latches 176a–e (FIG. 2q) provide indications of equipment error conditions.

Tag line signals represented by the Service-In and Status-In signals are produced by tag line latches 168a, 168b (FIG. 2o) for control purposes, through decode ANDs 169a–g and ORs 170a–e. Bus assembly circuits are provided in FIGS. 2m–n, including decode ANDs 157a–f, ANDs 158a–q, ORs 167a–e and line drivers 155a–i for assembling the Bus In bits. Parity for Bus In is provided by Exclusive ORs 178a–g, inverter 179 and AND 181. Bus Out parity check is provided by Exclusive ORs 189a–h through line receivers 156a–i.

In operation, the Carriage Control Buffer 40 (FIG. 2h) is loaded in response to a CCB Load command through decode AND 74c (FIG. 2b) from over the Bus Out lines 69 which sets the CCB Load latch 72c, provided that the CCB Gate Load latch 72a has been previously set by a command through decode AND 74a (FIG. 2b). The CCB Load latch 72c initializes the operation by resetting the CCB Address Register 56 (FIGS. 2d–e) to address 1 through ORs 171, 172, single shot 173, and OR 174 and sets the Buffer Control latch 80 through OR 81 (FIG. 2f). A delayed reset pulse is also provided by inverter 174a and single shot 174b to OR 174. The Buffer Control signals gates the triggers 56–1 and 56–2 of the CCB Address Register 56 at each R0 time to permit sequencing of the CCB addresses in each clock cycle.

Figures 3, 7:
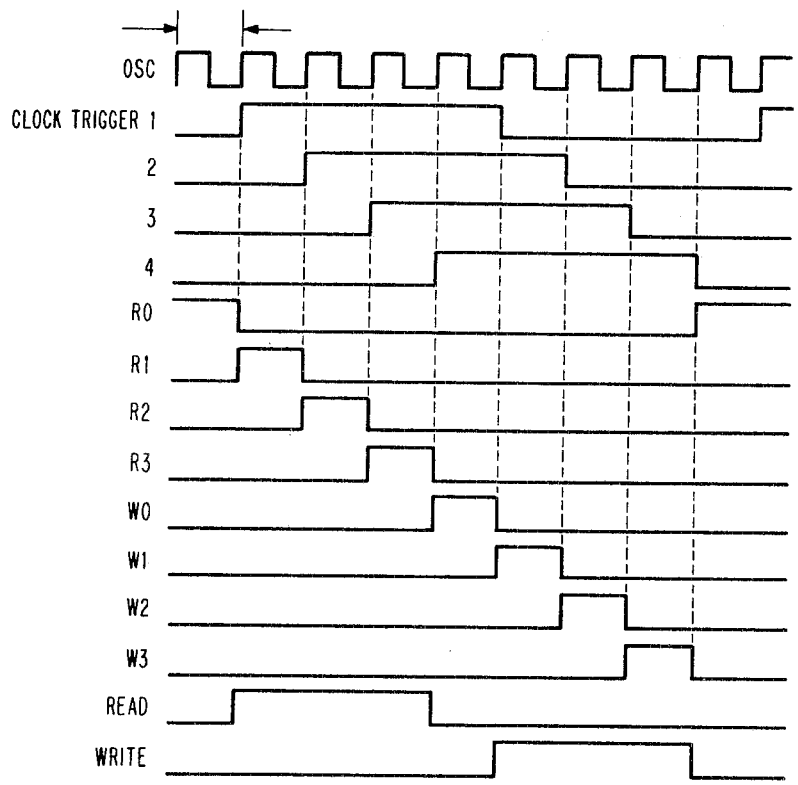
FIG. 3 is a block diagram showing the arrangement of FIGS. 2a through 2t.
FIG. 7 is a clock timing chart.

Since the command to load the buffer 10 has been stored in latch 72c (FIG. 2b) and the buffer address has been modified to the correct starting point, buffer byte 1, the control system is prepared to receive data from the channel (Bus Out 69). The data is loaded under the control of the I/O tag lines Service-In and Service-Out through AND 82 (FIG. 2n) which produces the Adapter Clock Start signal at OR 84. This sets the Clock Run trigger 62 (FIG. 2i) through OR 70 and AND 68, starting the clock 60 and permitting it to take one cycle. The Clock Run trigger 62 resets at the fall of trigger 60–4 of the clock 60, which corresponds to R0 time as shown in FIG. 7. Since the clock cycle is two microseconds, which is less than the minimum data period for a byte of data received from the Bus Out lines 69, the clock 60 will return to R0 before the next data byte is available.

Figure 2K:
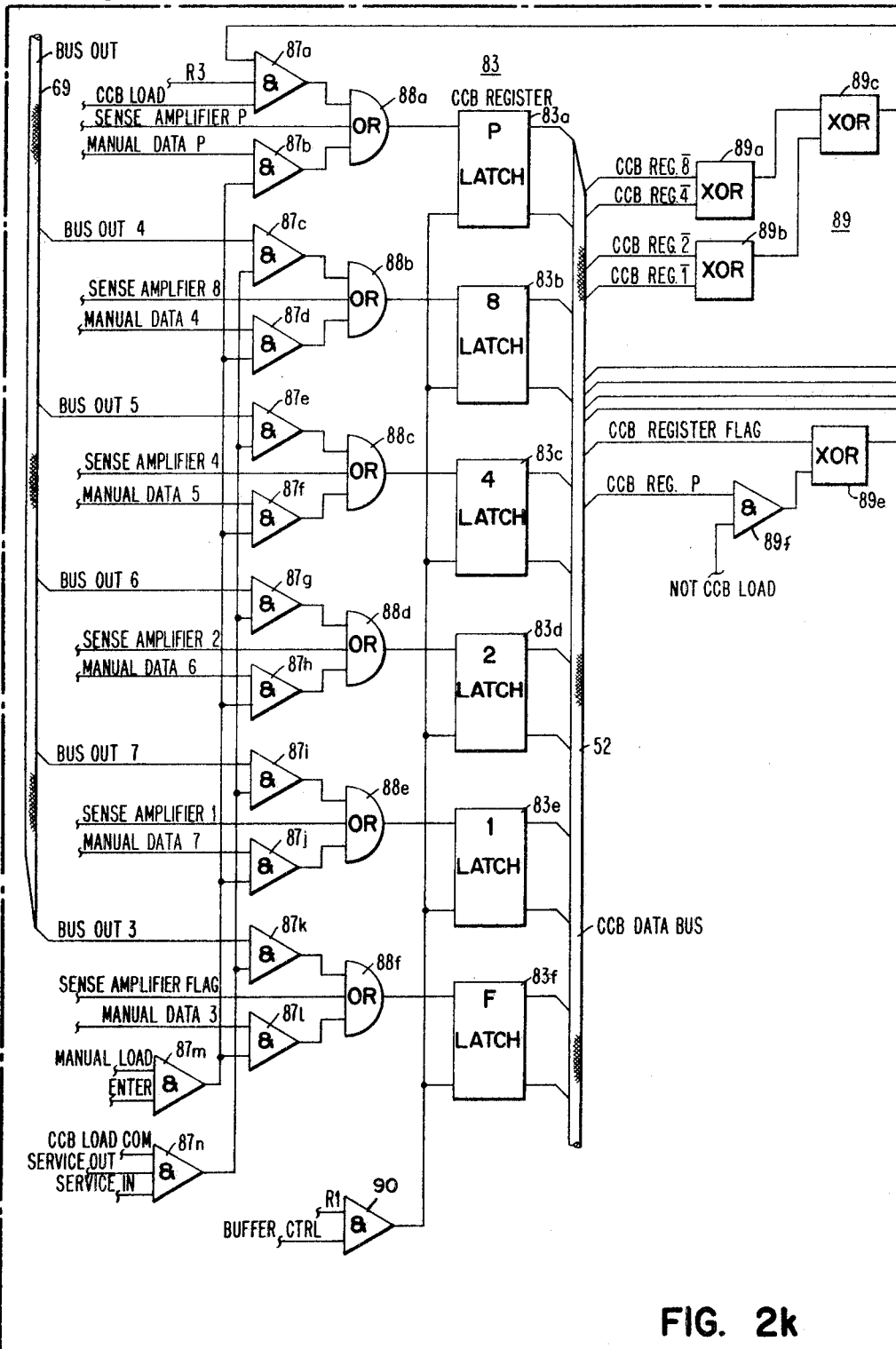
Figure 2L:
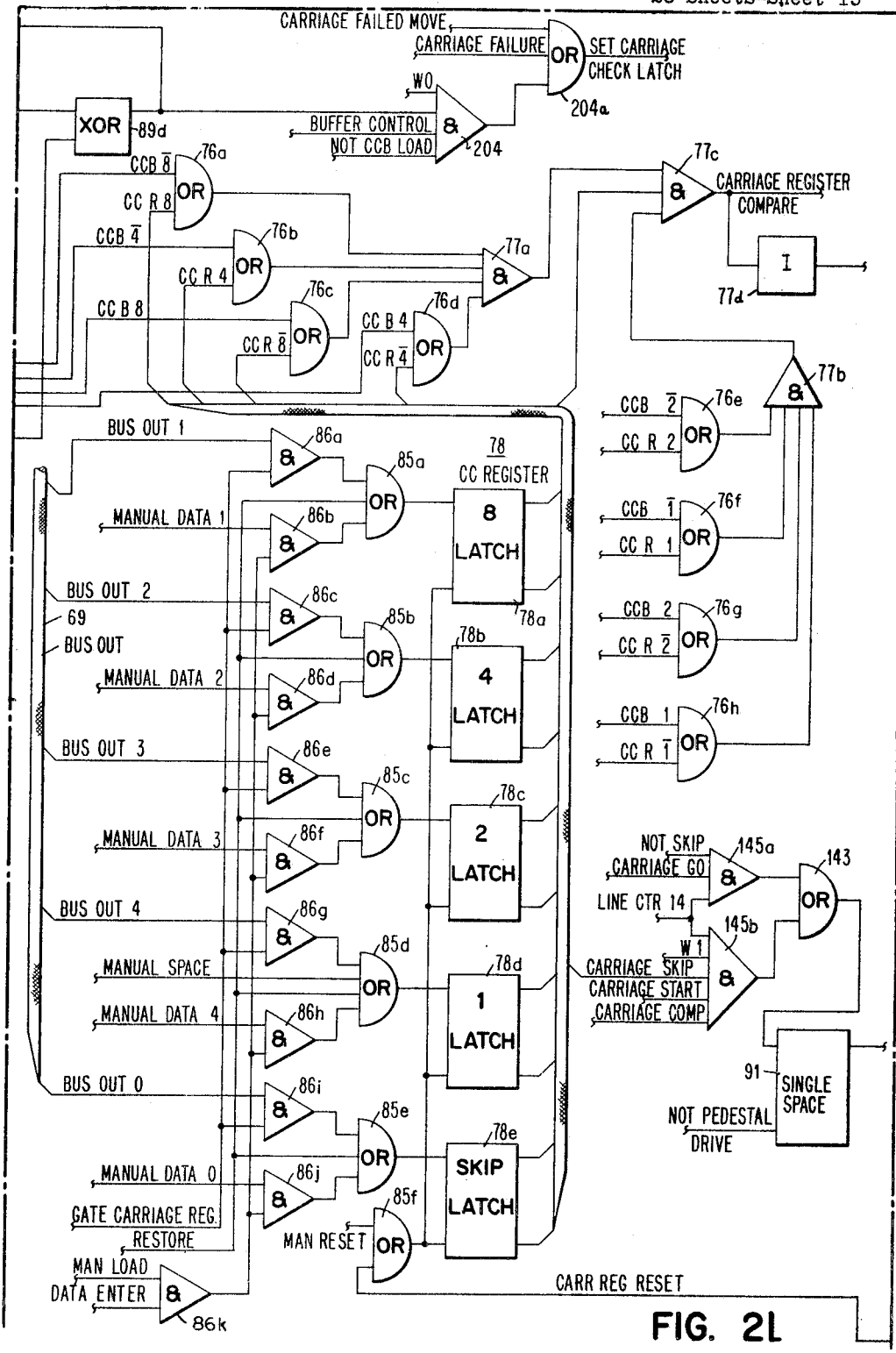
Figure 2M:
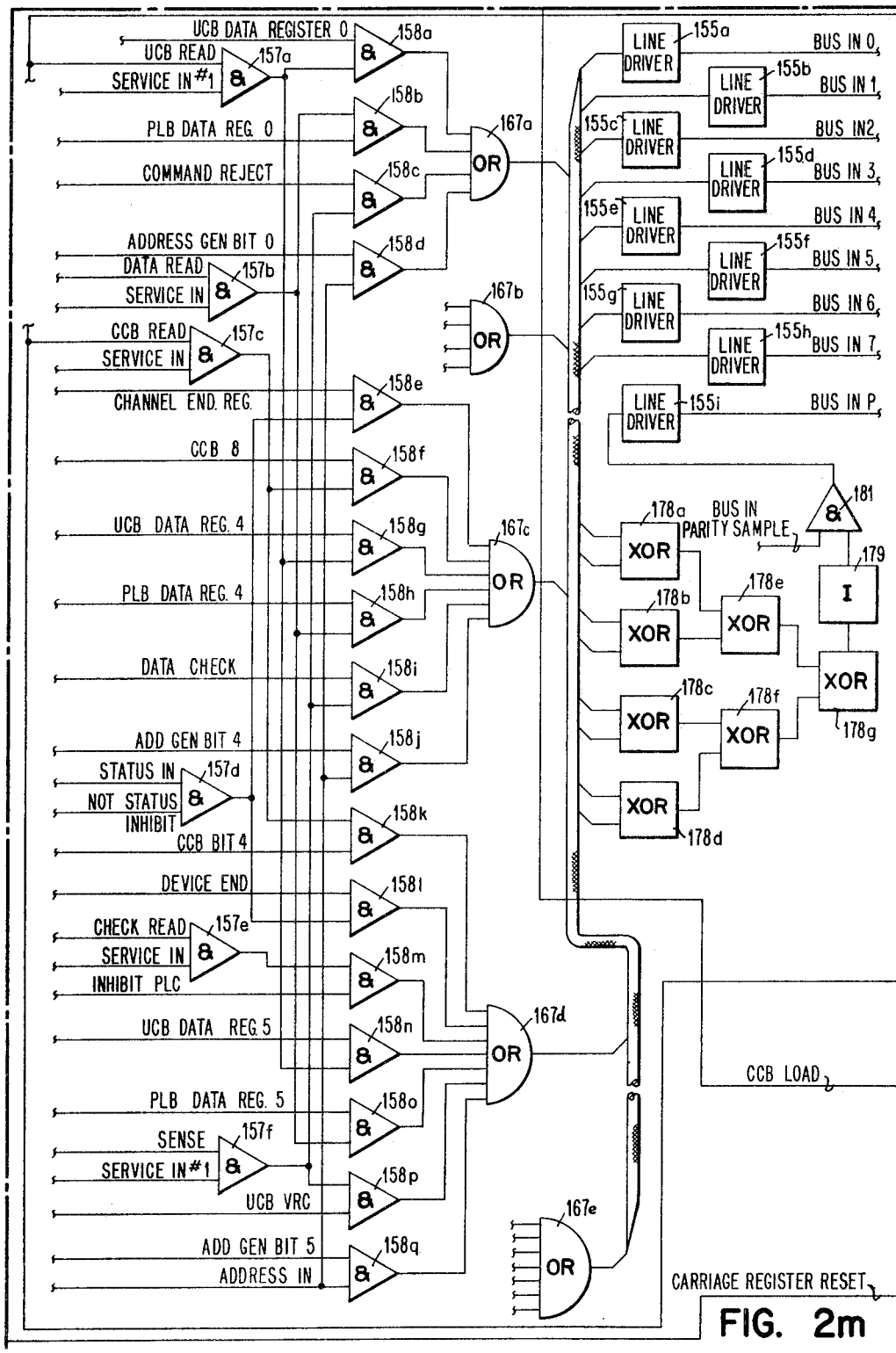
Figure 2N:
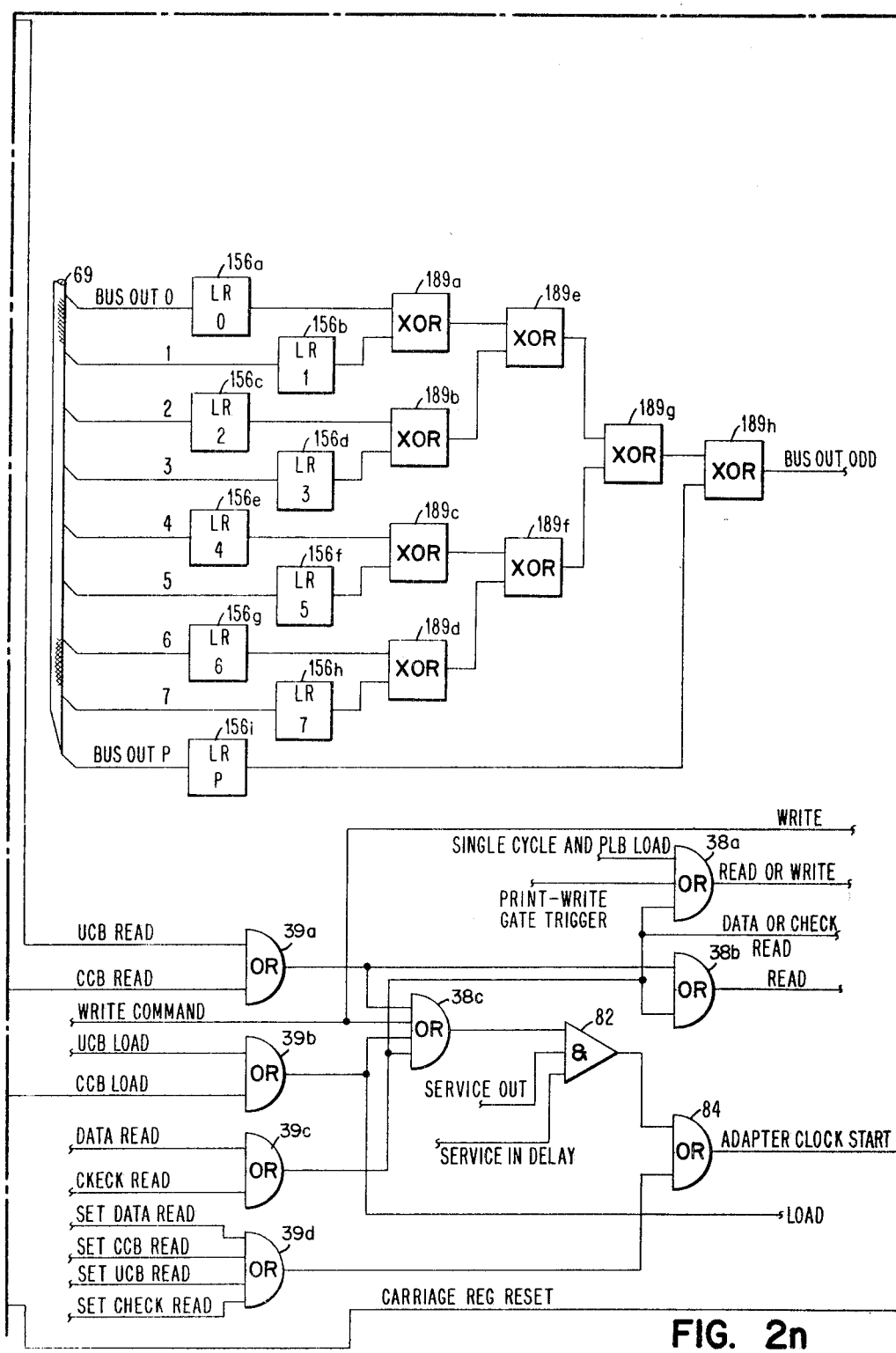
Figure 2O:
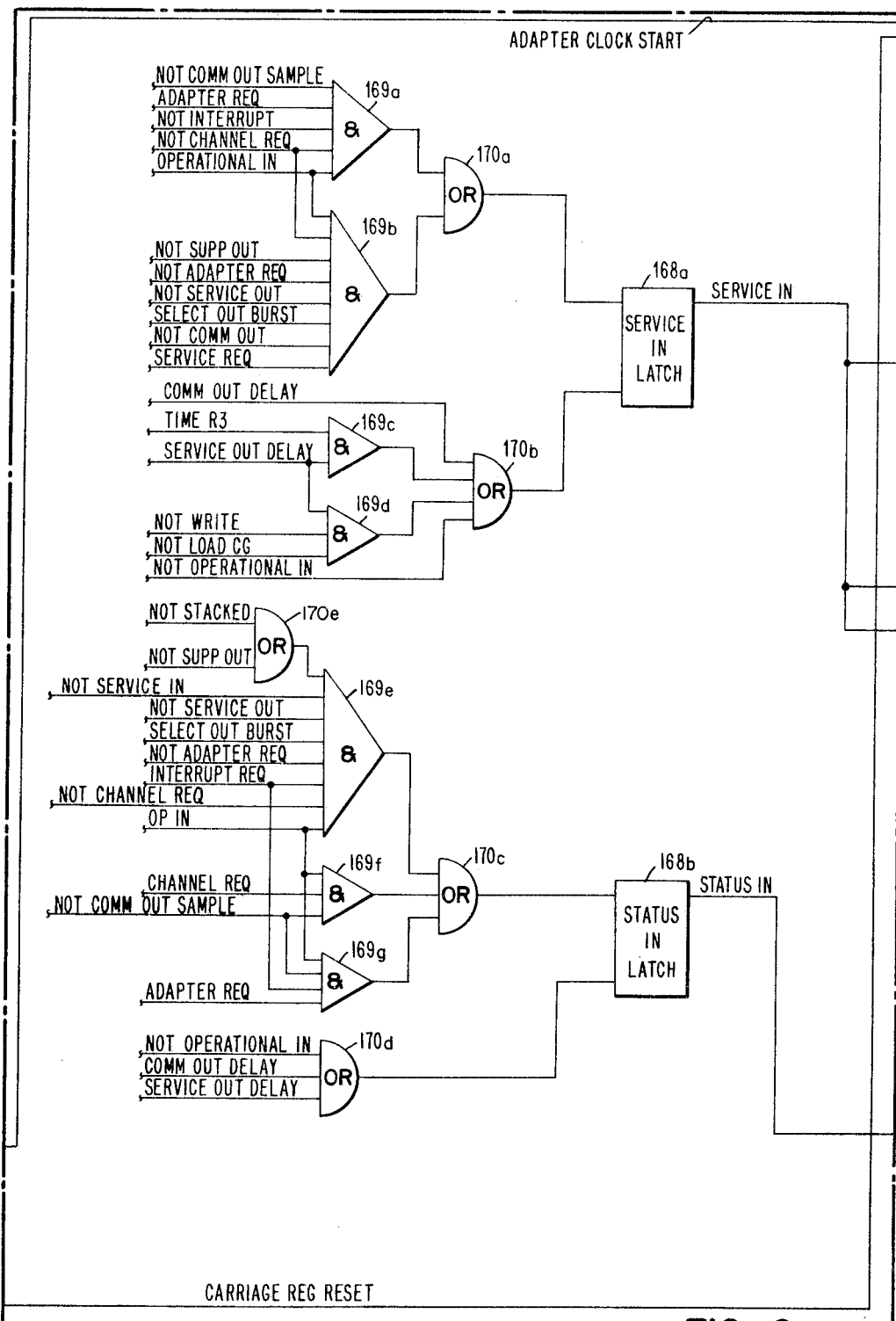
Figure 2P:
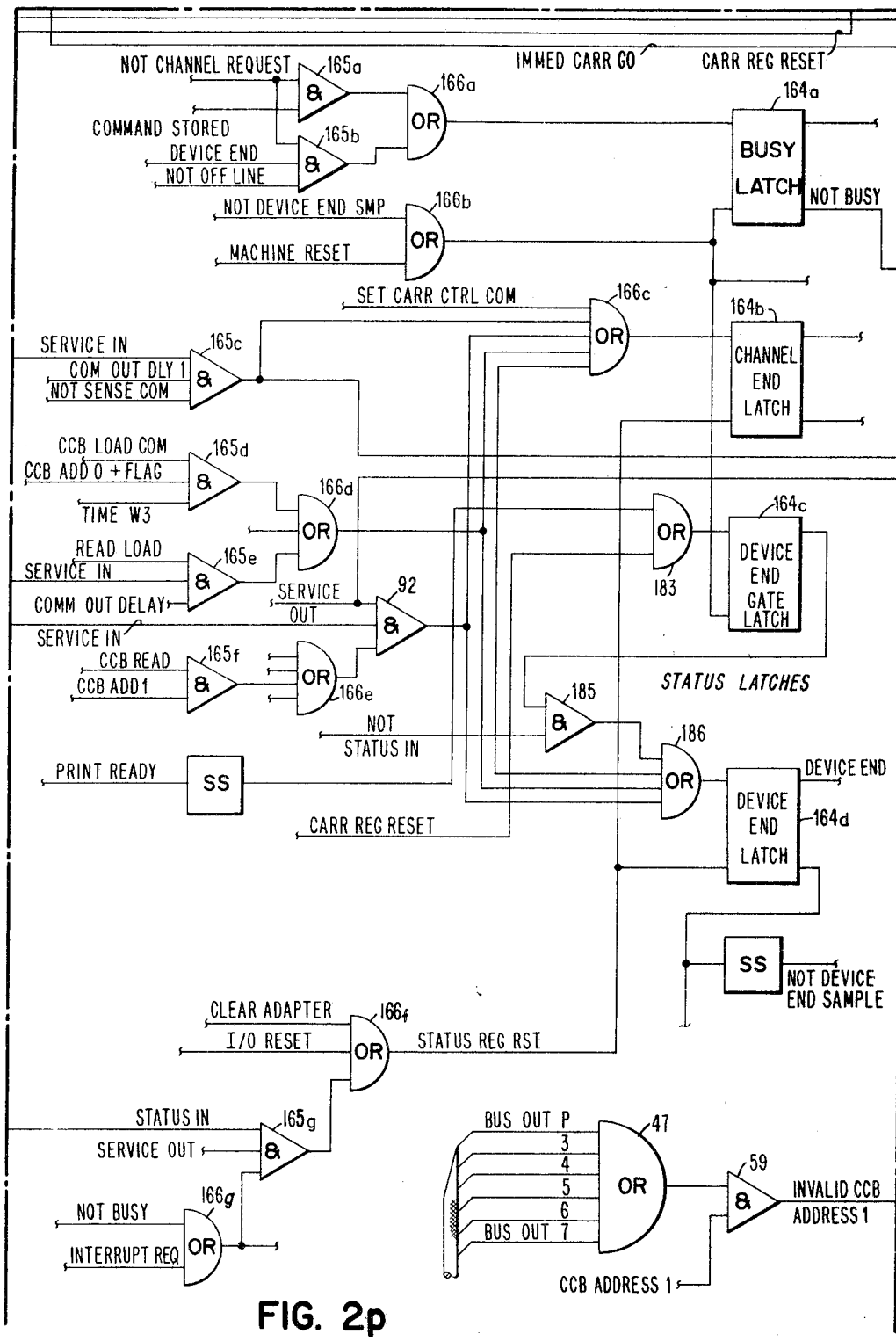

A CCB parity bit is generated from the CCB register 83 contents and is inserted in the bit latch 83a of the register 83 on an odd parity basis through the exclusive ORs 89a–d of parity circuit 89 (FIGS. 2k–l). The k–y drivers and switches 42, 46 and 44, 48 (FIG. 2g) are turned on to read by a Read Signal at R1, R2, and R3 time as shown by the timing chart in FIG. 7. However, the contents of bit 1 in the carriage Control Buffer 40 are not recycled because in loading the buffer 40 a Strobe signal (which is a delayed Read signal used to gate the sense amplifiers 54, and is produced by a time generator 38 (FIG. 2g) in response to a Read signal (RD) and rises only on a read operation) does not occur, and the output of the sense amplifiers is not gated in ANDs 55, so that the old contents of the Carriage Control Buffer 40 are erased during loading.

Figure 2Q:
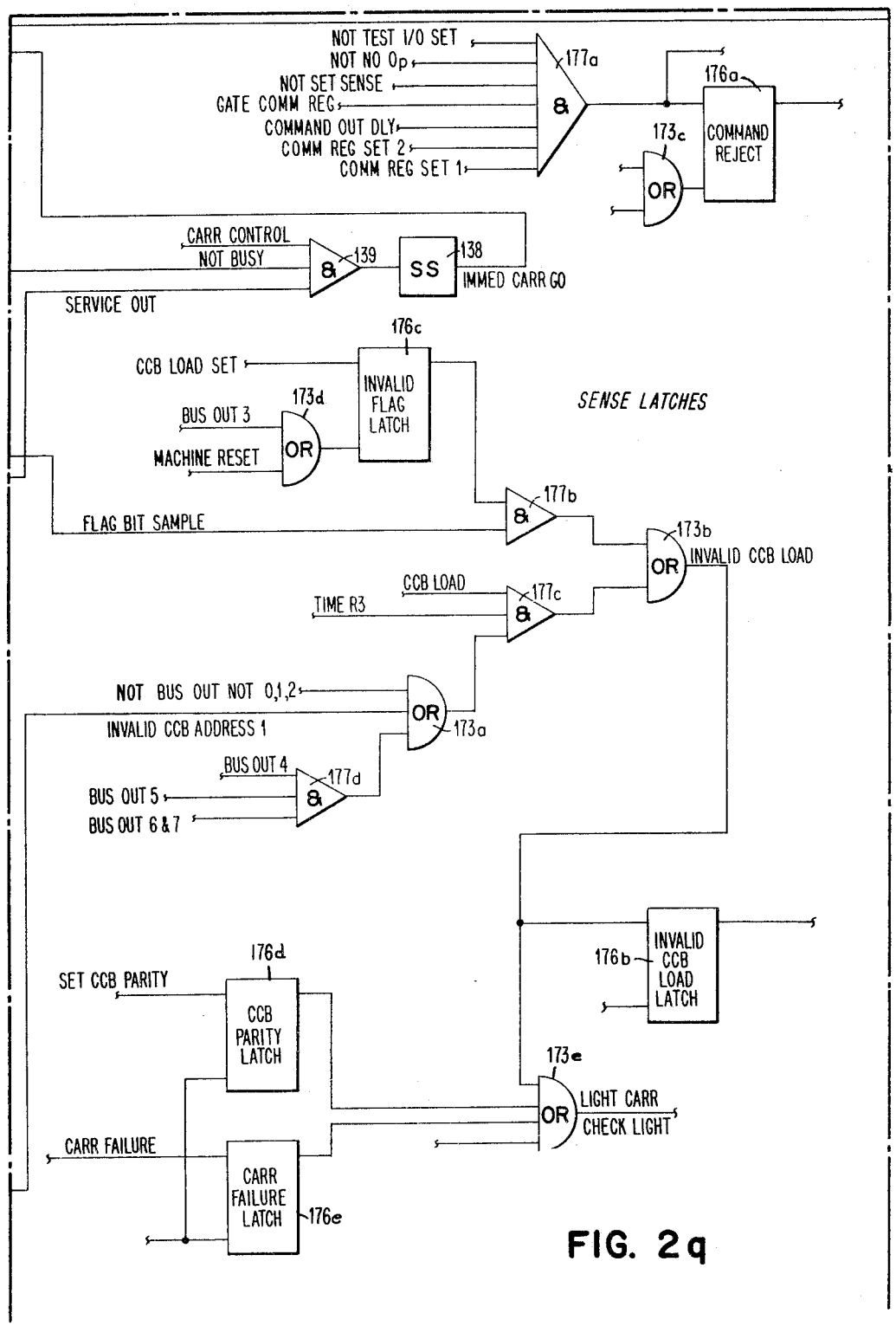
Figure 2R:
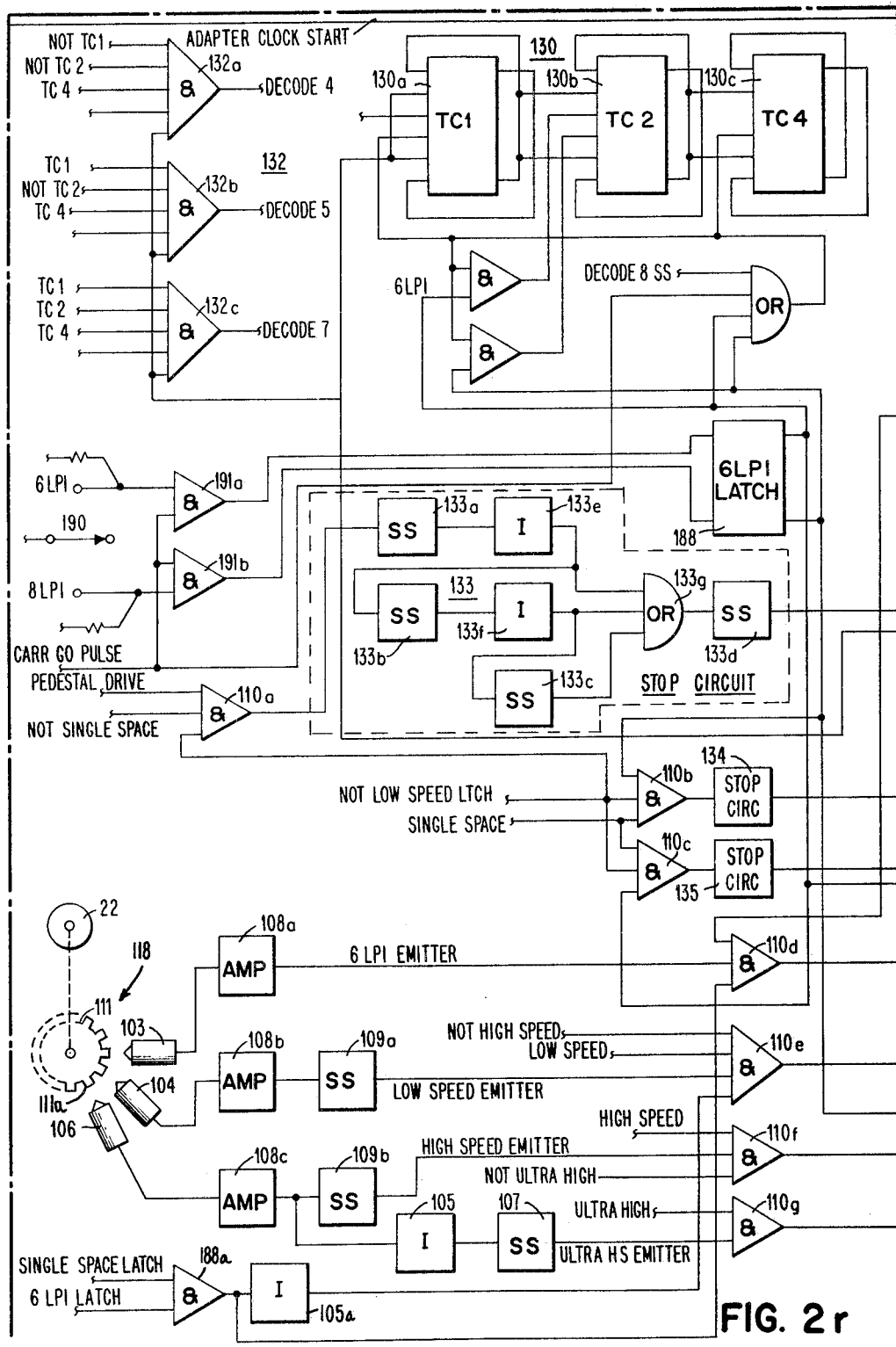
Figure 2S:
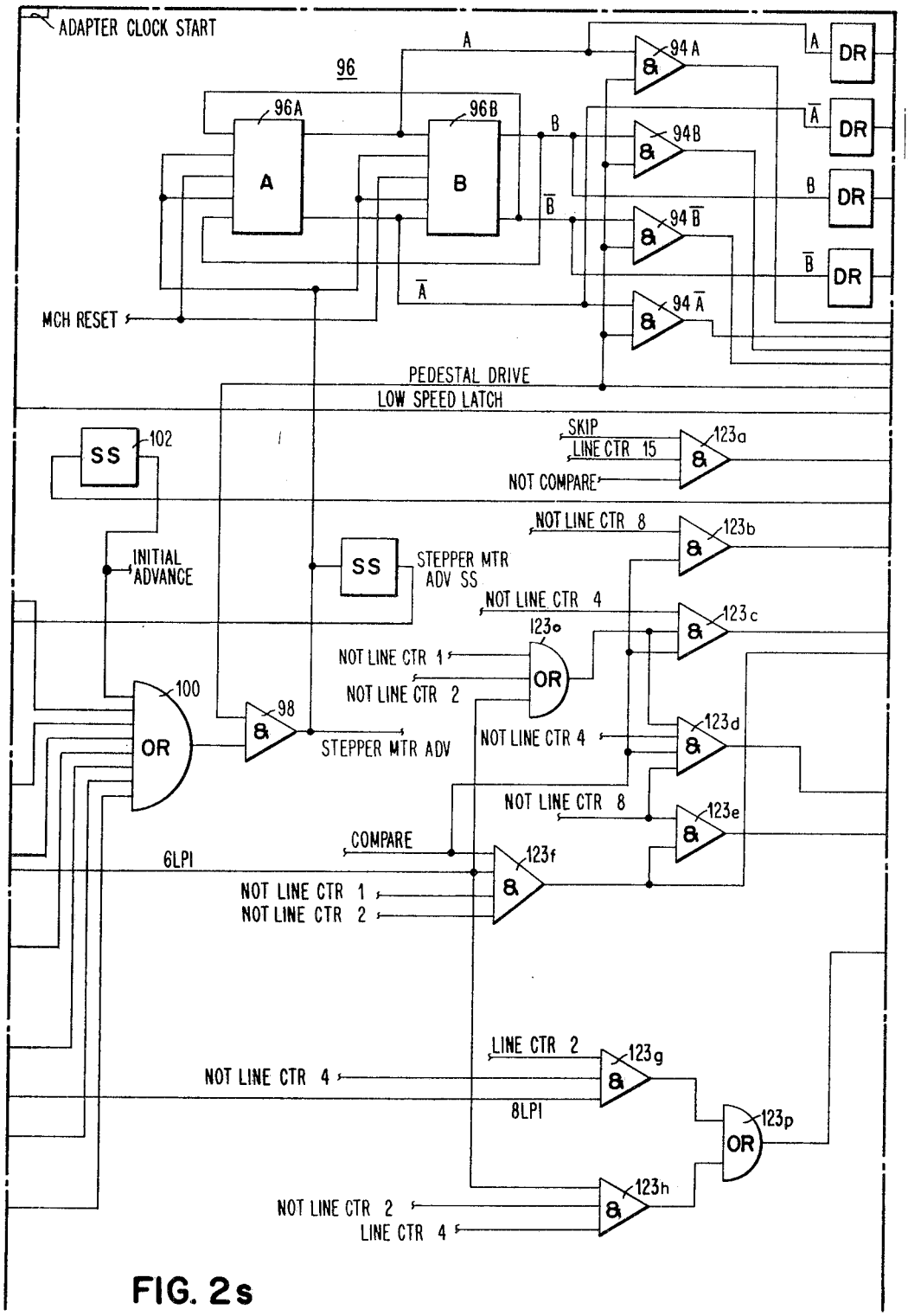
Figure 2T:
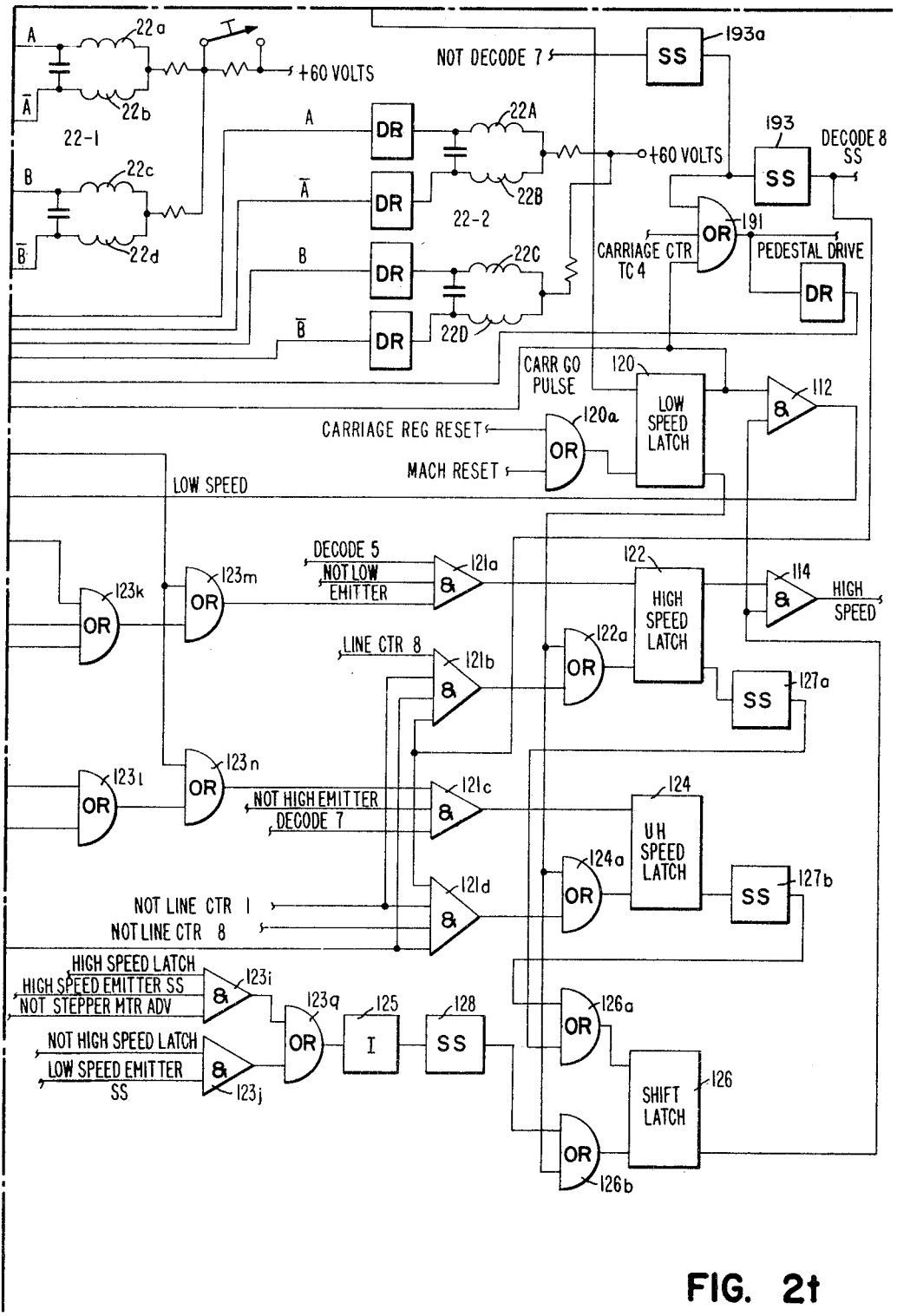

As described previously, data is loaded starting from position 1, and reset of the CCB Address Register 56 occurs with the coincidence of R0 and the CCB flag bit indicating the end of the line to be printed from AND 175 through OR 174 (FIGS. 2d–e). The clock 60 continues through the end of the current cycle and at R0 the CCB address will be advanced to position 2. The contents of position 1 remain in the CCB register 83. Should a program error occur during loading, as evidenced by the 0, 1, or 2, bits on Bus Out, a program error is indicated by Invalid CCB Load generated by latch 176b through OR 173a, or AND 177b, AND 177c and OR 173b (FIG. 2q). Other sense latches 176a, 176c, 176d and 176e function with AND 177a and OR 173c to produce a Command Reject signal; with OR 173d and AND 177b to produce an Invalid Flag signal; and with OR 173e to provide a CCB Parity check and a Carriage Failure check. AND 177d provides an input to latch 176b through OR 173a, AND 177c and OR 173b.

Carriage operations may occur with or without printing. The carriage commands shown in FIGS. 6a and 6b reflect this by describing the byte structure for an operation with a print command or for a carriage command alone. If the function is to Space/Skip immediate the Carriage Control latch 75a (FIG. 2c) is set through AND 63b, OR 65b and decode AND 66a. ANDs 66c and 66d provide inputs to latches 75c and 75d, respectively. OR 75e resets latch 75a. If a Write and Space/Skip command is sensed, the Write latch 75b will be set through OR 51a and OR 51b, AND 63a, OR 65a, and decode AND 66b. Reset is effected by Device End or I/O Reset signals through OR 75f. In either case, a carriage function is indicated so that Gate Carriage Register signal rises at OR 77 (FIG. 2c) to permit loading of the bus-out bits from Bus Out 69 to the Carriage Command register 78 (FIG. 2l) through ANDs 86a, c–e–g and i.

To perform a carriage function, the Carriage Start latch 140 (FIG. 2f) is set through OR 144 either by the Carriage Go After Print signal from AND 146 and AND 148, or the Immediate Carriage Go signal from AND 142 through single shot 138 and AND 139 (FIG. 2q) when a carriage command bit configuration exists from Bus-Out 69 and the Command-Out tag line rises. If the carriage is not already in motion, Carriage Start Latch 140 starts it by bringing up Carriage Go at AND 141 (FIG. 2f). The carriage will be started in the low speed mode by the Carriage Go signal setting the Low Speed latch 120 (FIG. 2t).

Assuming a carriage command is entered into the Command Register 78 (FIG. 2l) by a Gate Command Register signal from AND 65B (one of a group of ANDs 65A–65C (FIG. 2b) providing inputs to different ones of the Command Latches 75a–75d) (FIG. 2c) to space one line, then skip latch 78e of the Carriage Command register 78 will be off, so that the 4 and 8 triggers 150–4 and 150–8 of the line counter 150 will be set (FIG. 2d–e) by the Not Skip signal from AND 149 (FIG. 2d). The Not 2 bit of the Single Space command sets the 2 trigger 150–2 of the counter 150 through AND 147. Accordingly, line triggers 150–2, 150–4 and 150–8 will be set and a single space condition has been decoded from the Carriage Command register 78. The Line Counter 150 registers a count of 14, so the Single Space latch 91 (FIG. 2l) is set through decode AND 145a and OR 143 (AND 145b provides reset latch 91). Decode AND 145b provides for operating latch 91 when a command to skip one line is received as distinguished from a single space command. Carriage motion starts as follows: The Carriage Go signal from AND 141 (FIG. 2f) sets the Low Speed latch 120 (FIG. 2t), giving the carriage an Initial Advance pulse from single shot 102 (FIG. 2s) and starting motion by advancing the motor drive triggers 96A and 96B which switch current in the motor drive windings 22a–d and 22A–D in a well-known manner. Inverter 141a (FIG. 2f) provides a Not Carriage Go signal. Additional advance pulses occur from the motor emitters 103 or 104 through AND 98 and OR 100 from AND 110d or 110e so that the Carriage Counter 130 (FIG. 2r) advanced by the Stepper Motor Advance signal and its contents are decoded by the decode circuits 132 (FIG. 2r). For a pitch of 6 lines per inch, 8 pulses total are required for a single space advance and AND 110d is activated, and for 8 lines per inch, 6 pulses are required and AND 110e is effective. At Decode 4 time the CCB Address Counter Gate trigger 136 (FIG. 2f) is set, causing set of the Buffer Control latch 80 through AND 79 and OR 81, and starting the clock 60 by raising Carriage Clock 60 Start at AND 180 (FIG. 2f) and applying a signal to Clock Run trigger 62 (FIG. 2i) through OR 70 and AND 68 (FIG. 2i). Reset of CCB Address Counter Gate trigger 136 (FIG. 2i) is effected at W1 time, being gated in AND 136a by Buffer Control and the CCB Address Counter Gate trigger 136 ON output. AND 136b insures the proper timing relative to Carriage Settling. The fall of CCB Address Counter Gate trigger 136 causes the OFF output to gate reset of Buffer Control latch 80 at R0 in AND 196. The clock 60 takes one cycle stopping in R0. In doing so, the contents of the CCB byte 2 are read out to the CCB register 83, and the CCB Address Register 56 advances to position 3 as R0 time. The Line Counter 150 was advanced to count 15 at the fall of R1 time, and line count 15 and W2 signals reset the Carriage Start latch 140 (FIG. 2f) through OR 131, AND 137, and OR 115.

When the Carriage Counter 130 (FIG. 2r) advances to Decode 5, a Stop pulse is generated at OR 160 through AND 162 (FIG. 2f). ANDs 160a and 160b provide other inputs to OR 160. This turns on the Carriage Register Reset signal at single shot 161 which resets the Line Counter 130 through OR 182 (FIG. 2d) and the Carriage Command register 78 through OR 85f (FIG. 2l). It also turns on the Device End Gate latch 164c through OR 183 (FIG. 2p) causing the Device End latch 164d to turn on through AND 185 and OR 186, producing the Device End signal in the channel status byte. This indicates to the channel that the carriage operation is ended.

The Line Counter Reset signal from the line counter 150 (FIG. 2d–e) also initiates the actual carriage stopping sequence by resetting the Low Speed latch 120 (FIG. 2t), which starts a single shot string of 3 stop pulses through AND 110b, Stop circuit 134 (FIG. 2r) assuming 8 lines per inch pitch), OR 100, and AND 98 (FIG. 2s), and gates out or inhibits (FIG. 2r) at AND 110e the feedback pulses from the motor emitter 104.

The Carriage Counter 130 (FIG. 2r) advances six pulses per line when printing at 8 lines per inch and eight pulses per line when printing at 6 lines per inch. The particular pitch is determined by a line pitch latch 188 through switch 190 and AND's 191a–b (FIG. 2r). The triggers 130a, 130b and 130c are gated to bring up the Decode 4 signals four pulses from the end of the line space, Decode 5 signal 3 pulses from the end of a line space, and the Decode 7 signal one pulse from the end of a line space. The counter 130 is reset on the eighth or last pulse by Decode 8, produced by a single shot 193 from a single shot 193a (FIG. 2t) in response to a Not Decode 7 signal.

For a double or triple space, the same Carriage Start, Line Counter control and CCB Address Register 130 timing applies for the first line space. But for additional line spaces, the clock 60 is started by each Decode 4 signal which sets the CCB Address Counter Gate trigger 136 (FIG. 2f) starting the clock 60 for one cycle. Each clock cycle advances the Line Counter 150 (FIGS. 2a–e). When the Line Counter contents is 15, Line Count 15 rises at AND 151 (FIG. 2e) which resets CCB Address Counter Gate trigger 136, and brings up the Stop pulse at AND 162 (FIG. 2f) at Decode 5 time, starting the stop sequence which stops the carriage mechanism. Carriage Register Reset signal from the single shot 161 starts the carriage operation ending sequence, as previously described. Note that the Line Counter 150 is initialized to a count of 13 through ANDs 116 and 149 for a double space, and to a count of 12 through AND 149 alone for a triple space at the start of the space command.

Description of a low speed skip operation is as follows: A Skip Immediate or Skip After Write command will be entered in the Carriage Command register 78 (FIG. 2l) and the bus out bit 0 will turn on the Skip Latch 78e in the register 78. The Carriage Start latch 140 (FIG. 2f) will be turned on by Immediate Carriage Go or Carriage Go After Print from AND 142 or AND 146 through OR 144. The CCB Address Counter Gate trigger 136 is set by the Carriage Start signal through AND 192 and OR 194 and brings up Carriage Clock Start at AND 180. The Buffer Control latch 80 will be set by the on output of the CCB Address Counter Gate trigger 136, gating the advance of the CCB Address Register 56 at R0 time (FIGS. 2d–e). The clock 60 will advance the CCB Address Register 56 and the Line Counter 150. The carriage mechanism has been activated by the Carriage Go signal generated by the Carriage Start latch 140 and AND 141 (FIG. 2f).

The Carriage Start latch 140 is not reset, so the return of the clock 60 to R0 again sets the CCB Address Counter Gate trigger 136 through AND 192 and OR 194 (FIG. 2f) permitting the clock 60 to run an additional cycle. The Line Counter 150 and the CCB Address Register 56 (FIGS. 2d–e) advance, and the contents of the addressed bit location in the Carriage Control Buffer 40 is read out to the Carriage Control Buffer Register 83 each clock cycle.

Assume that the skip channel digit stored in the bits 1, 2, 4, and 8 of the Carriage Command Register 78 is stored in byte 5 of the Carriage Control Buffer 40, and assume also that the forms were located at line 1 when the carriage skip was started. As shown in the timing diagram of FIG. 7, a Carriage Register Compare signal will occur at AND 77c (FIG. 2l) when the contents of CCB position 5 is read into the CCB register 83 (inverter 77d provides a Not Carriage Register Compare signal used to inhibit operation of the Buffer Control Latch 80 (FIG. 2f)). This will set the Carriage Compare latch 159 through OR 113a, AND 113 and OR 117 (FIG. 2f). AND 113b provides another input to OR 117. Further advance of the CCB Address Register 56 is inhibited after R0 of the current clock cycle because CCB Address Counter Gate trigger 136 is reset through AND 67 and OR 95. The CCB Address Register 56 will have advanced four times. Carriage Compare from the latch 159 resets CCB Address Counter Gate trigger 136 and the Carriage Start latch 140. The Line Counter 150 is complemented by the Carriage Compare signal over conductor 195 (FIG. 2d) (gated by an input on line 197 through OR 154c from AND 154b, one of two inputs from ANDs 154a–154b) so that its contents are changed from a count of 4 to a count of 11. The clock 60 completes the present cycle and stops in R0. AND 117a provides for reset of latch 159. The Cariage Go signal from the Carriage Start latch 140 (FIG. 2f) started the carriage by setting the Low Speed latch 120 (FIG. 2t), turning on Pedestal Drive at OR 191 to gate AND's 94A, B, $\overline{A}$ and $\overline{B}$, gating the emitter pulses from OR 100 at AND 98.

Only 8 microseconds will have elapsed, so the first Decode 4 signal from the Carriage Counter 130 (FIG. 2r) will not have yet been generated. The first Decode 4 signal sets the CCB Address Counter Gate trigger 136 (FIG. 2f) causing the clock 60 (FIG. 2i) to take one cycle. The three following carriage emitter signals from AND 98 (FIG. 2s) do likewise. The Line Counter 150 contents is now 15, bringing up Line Count 15 at AND 151 (FIG. 2e) which brings up the Stop pulse at AND 162 (FIG. 2f). Carriage Register Reset signal from OR 160 and single shot 161 (FIG. 2f) resets the Command Register 78 (FIG. 2l) and the Line Counter 150 (FIGS. 2d and e), and initiates the carriage stopping sequence by resetting the Low Speed latch 120. Reset of the Low Speed latch 120 (FIG. 2t) causes the mechanism to stop as previously described. The carriage has advanced four lines from 1 to 5. Carriage Control Buffer 40 has advanced from position 2 to position 6.

Assume that the command is loaded to skip to a forms channel 15 line spaces or more from the present print line. Specifically assume that the channel digit is stored in position 20 of the Carriage Control Buffer 40 and line 1 was the last line printed. In this case, a Carriage Compare signal from Carriage Compare latch 159 (FIG. 2f) will not occur during 15 initial advances of the Line Counter 150. When the Line Counter 150 reaches a count of 15, inverter 153 (FIG. 2e) inhibits further advance of the Line Counter 150. In each of the 15 clock pulses the CCB Address Register 56 was advanced, so that the CCB Address is 16 line spaces ahead of the actual forms line. The first and successive Decode 4 pulses from the decode circuit 132a (FIG. 2r) will force additional stepping of the CCB Address Register 56 (FIGS. 2d, e) until Carriage Register Compare occurs at AND 77c (FIG. 2l), at CCB address 20, turning on Carriage Compare latch 159 at W0 time through AND 113 and OR 117 (FIG. 2f). Further advance on the CCB Addreses Register 56 (FIGS. 2d–r) is inhibited when Buffer Control latch 80 (FIG. 2f) is gated down after reset of CCB Address Counter trigger 136 at W1 time after compare by R0 through AND 196. Since the Buffer Control signal is a d–c level signal applied to the D-C gates 56b and 56c of CCB1 triggers 56–1, R0, which is a pulse signal applied to the A-C inputs 56d and 56e of the trigger 56–1, will also advance the CCB Address Register 56 to 21 even though R0 resets Buffer Control latch 80. The Line Counter 150 is complemented to zero by the Carriage Compare signal, and carriage advance continues. Each Decode 4 signal causes the advance of the Line Counter 150 as previously described since Line Count signal 15 came down when the Line Counter 150 was complemented. Fifteen line spaces after Carriage Compare occurred, Line Count signal 15 rises at AND 151 (FIG. 2e) generating the Stop pulse at AND 162 (FIG. 2f). The same stopping procedure will occur as described previously and the form will stop in position 20 with the CCB address register 56 containing address 21.

When the Line Counter 150 initially advances to 15 without a compare, High and Ultra High Speed conditions were generated through AND 123a, OR's 123m and 123n and AND's 121a and 121c which sets the High Speed latch 122, and the Ultra High Speed latch 124 at Decode 5 and Decode 8, respectively. Thus, for a few microseconds, carriage advance was called for in Low Speed and was then changed to a High Speed and finally an Ultra High Speed mode. Of course, no carriage motion actually occurred during this short time. The Ultra and High Speed modes are removed a number of lines, for example, at counts of 13 and 11, and 5 and 3 for 8 and 6 lines per inch, respectively, before the stopping point, by the reset of the Ultra and High Speed latches 124 and 122 through AND's 121d and 121b and OR's 124a and 122a in response to line counts through AND 123g or AND 123h, and OR 123p (FIG. 2s), respectively. Thus, it will be seen that a high speed skip will occur if the channel skip is 15 or more line spaces away or if a skip is greater than four times at 6 lines per inch, or greater than 6 lines at 8 lines per inch. The specific skip range depends on the carriage drive velocity time characteristic. Likewise, control of the deceleration by decode of the displacement in line increments to the stopping point using the Line Counter contents can be used in other types of carriage mechanisms by using different decode values.

During a space or skip operation, the printer may come to the end of a form. When the printer is at the next to last line of a form, but the carriage emitter pulse indicating that the forms are moving to the last line has not occurred, the Carriage Address Register 56 contains the address of the last line of the form and the Carriage Control Buffer Register 83 (FIG. 2k) will contain the byte associated with the next to last line of the form. When the Decode 4 pulse is received for the last line of the form, the Carriage Control Buffer Register 83 will be loaded with a byte containing the flag bit indicating the end of the document. Detection of the flag bit resets the CCB Address Register 56 (FIGS. 2d–e) through AND 175 and OR 174. This is a D-C reset and occurs at R0, overriding the CCB address register advance which normally occurs at R0. When the clock 60 stops at R0, the CCB address is 1, the carriage latch 83f contains a flag bit and the form is at last line and moving. ANDs 57a, 57b (FIG. 2e) decode Address 0 for providing a CCB Address 0 or Flag signal at OR 58, and CCB Address 1, respectively.

A Carriage Run Away latch 200 (FIG. 2d) is provided which is set through AND 202, reset through OR 201 by Carriage Go or by an input from OR 172, and provides a Run Away signal at AND 203 if CCB address 1 occurs with the Carriage Run Away latch 200 set (inverter 205 (FIG. 2e) provides a Not Carriage Runaway Signal). This senses that two channel ones occurred during the same forms command so that a complete form has passed by the print line without stopping the mechanism. The parity check circuit 89 (FIG. 2k) is checked for parity every W0 time on an Odd bit basis through AND 204 and OR 204a (FIG. 2l). Normally, a carriage emitter signal should occur for every line space although the emitter pulse which occurs during stopping is not functionally necessary. The Carriage Command Register 78 may have been inadvertently loaded with a forms channel digit which was not in fact loaded into the carriage control buffer 40. This is a programming error. When the carriage is set in motion, controls will look for this valid channel in the buffer 40 but none will be found. If a complete form passes by the print line as sensed by the existence of two carriage address 1 conditions in the same command, a channel code did not exist, and a Carriage Run Away condition is occurring.

From the above description and the accompanying drawing, it will be apparent that the present invention provides a simple and effective multiple speed stepping motor drive for a printer carriage. Maximum throughput may be obtained by utilizing the different speeds in different combinations in response to different spacing conditions. The same stopping sequence is observed for all spacing conditions and positive control of the motor 22 is obtained under all operating conditions with maximum performance.

What is claimed is:
1. In a control system for a carriage stepping motor connected in driving relation with a document tractor and having a plurality of phase-related windings connected to switching means operable to sequentially effect energization of said windings and cause said motor to advance one step at a time in response to successive pulses applied to said switching means,
   emitter means including an emitter disc driven by said motor operable to produce two or more groups of pulses in response to step advances of said motor, with the pulses in each of said groups having different time and displacement relations with respect to the pulses of another of said groups,
   a plurality of gate means connected to said switching means and to said emitter means for selectively applying one or another of said groups of pulses from said emitter means to said switching means for operating said stepping motor at one speed or another speed,
   bistable latch means including a low speed latch and a high speed latch connected to different ones of said gate means to selectively control said gate means for applying said one or another of said groups of pulses to said switching means,
   circuit means connected to said low speed latch to set said low speed latch in response to a carriage go signal,
   and means including a line counter connected to said emitter means and to both of said latch means to be operated by emitter pulses to selectively set and reset said high speed latch, and provide a stop signal and reset said low speed latch.

2. A control system for a carriage stepping motor as defined in claim 1 characterized by said emitter means comprising a slotted emitter disc of magnetic material driven by said motor and a first emitter pickup head selectively connected by said gate means to said switching means to apply thereto one group of pulses having a first normal phase relation, and having inverter means connected between said emitter pickup head and said gate means to apply a second group of different speed inverted phase relation pulses to said switching means.

3. A control system for a carriage stepping motor as defined in claim 2 characterized by means including a shift latch and additional gate means connected to said low speed latch and said high speed latch to gate the outputs thereof, said shift latch also being connected to said low speed latch and said high speed latch to be set by reset of said high speed latch and reset by reset of said low speed latch, to inhibit gating of said output of said low speed latch for a predetermined timed and displacement interval.

4. A control system for a carriage stepping motor as defined in claim 2 characterized by said inverter means of said emitter means comprising a plurality of inverter means connected in cascade to said first emitter pickup head and to said gate means for providing a plurality of successively inverted different time and displacement relation pulse signals selectively operable to operate said switching means at different rates.

5. A control system for a carriage stepping motor as defined in claim 1 characterized by said emitter means comprising a first low speed emitter pickup head and a second high speed pickup head connected to said gate means to provide pulses for operating said switching means, said second high speed emitter head being positioned closer to the next emitter tooth than said first low speed emitter head.

References Cited

UNITED STATES PATENTS

| | | | |
|---|---|---|---|
| 2,944,651 | 7/1960 | Malcolm et al. | 197—133 |
| 3,094,261 | 6/1963 | Thomspon | 197—133 X |
| 3,123,195 | 3/1964 | Hewitt et al. | 197—133 |
| 3,171,349 | 3/1965 | Kodis et al. | 101—93 |
| 3,192,854 | 7/1965 | Martin | 101—93 |
| 3,292,530 | 12/1966 | Martin | 101—93 |
| 3,312,174 | 4/1967 | Cunningham | 197—133 X |
| 3,343,131 | 9/1967 | Bloom et al. | 101—93 X |
| 3,354,816 | 11/1967 | Giannuzzi | 101—93 |

ERNEST T. WRIGHT, JR., Primary Examiner